(12) United States Patent
Vicari

(10) Patent No.: US 7,790,815 B2
(45) Date of Patent: *Sep. 7, 2010

(54) VINYL ALCOHOL COPOLYMERS FOR USE IN AQUEOUS DISPERSIONS AND MELT EXTRUDED ARTICLES

(75) Inventor: Richard Vicari, Pearland, TX (US)

(73) Assignee: Serisui Specialty Chemicals America, LLC, Dallas, TX (US)

( * ) Notice: Subject to any disclaimer, the term of this patent is extended or adjusted under 35 U.S.C. 154(b) by 75 days.

This patent is subject to a terminal disclaimer.

(21) Appl. No.: 10/946,970

(22) Filed: Sep. 21, 2004

(65) Prior Publication Data

US 2005/0065272 A1 Mar. 24, 2005

Related U.S. Application Data

(63) Continuation-in-part of application No. 10/618,248, filed on Jul. 11, 2003, now Pat. No. 6,818,709.

(51) Int. Cl.
*C08F 2/00* (2006.01)
*C08F 20/00* (2006.01)
*C08F 12/28* (2006.01)
*C08F 218/02* (2006.01)

(52) U.S. Cl. .......... 526/65; 526/67; 526/303.1; 526/310; 526/330

(58) Field of Classification Search .......... 526/65, 526/67, 303.1, 310, 330
See application file for complete search history.

(56) References Cited

U.S. PATENT DOCUMENTS 5,945,457 A * 8/1999 Plate et al. .............. 514/772.1
6,609,018 B2 * 8/2003 Cory et al. ................ 600/393
6,818,709 B1 * 11/2004 Vicari .......................... 526/65
2005/0222355 A1 * 10/2005 Vicari ........................ 526/330

FOREIGN PATENT DOCUMENTS

JP 62-33241 * 6/1981

* cited by examiner

*Primary Examiner*—William K Cheung
(74) *Attorney, Agent, or Firm*—Michael W. Ferrell

(57) ABSTRACT

In a method of preparing an aqueous dispersion selected from drilling fluids, hydraulic cement compositions, mineral pigment containing coatings, and papermaking furnishes or in a method of preparing a melt extrudate, the improvement comprising:

a) producing a copolymer of vinyl alcohol (VOH) and 2-acrylamido-2-methyl propane sulfonic acid or a salt of such acid (AMPS) by steps including continuously feeding with agitation, vinyl acetate (VAM) and AMPS as comonomers, a free radical yielding polymerization initiator, and a solvent for said comonomers, initiator, and copolymer resulting from the copolymerization of said comonomers, maintaining the resulting reaction mass in said first reaction zone under polymerization conditions for a residence time sufficient for a major proportion of AMPS fed to said first reaction zone to polymerize, continuously feeding reaction mass from said first reaction zone with an additional supply of AMPS to a second reaction zone, maintaining the reaction mass in the second reaction zone for a residence time sufficient to polymerize a major proportion of the AMPS added to the second reaction zone, continuously withdrawing reaction mass from the second reaction zone, separating copolymer of VAM and AMPS from the latter reaction mass, and saponifying by hydrolysis and/or alcoholysis a major proportion of the acetate groups in said copolymer to form a copolymer of VOH and AMPS; and b) incorporating the saponified copolymer into the aqueous dispersion or melt extrudate.

11 Claims, 4 Drawing Sheets

US 7,790,815 B2

VINYL ALCOHOL COPOLYMERS FOR USE IN AQUEOUS DISPERSIONS AND MELT EXTRUDED ARTICLES

CROSS REFERENCE TO RELATED APPLICATION

This application is a continuation-in-part of U.S. patent application Ser. No. 10/618,248 entitled "Production of Vinyl Alcohol Copolymers", filed on Jul. 11, 2003, now U.S. Pat. No. 6,818,709, the priority of which is hereby claimed.

TECHNICAL FIELD

The present invention relates to an improved polyvinyl alcohol copolymer and use of that copolymer to novel applications such as aqueous clay dispersions as a slip agent and fluid loss control agent in hydraulic cement and drilling fluids.

DESCRIPTION OF RELATED ART

Copolymers of vinyl alcohol (VOH) with a minor amount of 2-acrylamido-2-methyl propane sulfonic acid in free acid form or as a salt of the free acid (AMPS) are known in the art. A problem with the production of these copolymers by prior art methods is that it is difficult to produce the copolymer with a sufficiently high content of polymerized AMPS while maintaining satisfactory levels of productivity and avoiding compositional drift, i.e., unacceptable variations in the content of AMPS in the copolymer from one batch to the next. Thus, any process which is capable of producing VOH/AMPS copolymers with satisfactory loading of polymerized AMPS, combined with relatively high productivity and low compositional drift, is much to be desired. Due to the difficulty of producing these polymers, they have seen limited commercial application.

The polymers are disclosed in an article by T. Moritani and I. Yamauchi, "Functional modification of poly(vinyl alcohol) by copolymerization: II. Modification with a sulfonate monomer", POLYMER, Vol. 39, No.3, pp. 553-557, 1998. The Getzler reports poly(vinyl acetate-co-vinyl alcohol)s copolymerized with sodium 2-acrylamide-2-methyl propane sulfonate (SAMPS) having much lower degrees of hydrolysis than previously used polyvinyl alcohols, are effective as water-soluble polymers. The reference discloses the use of the copolymers for paper sizing, textile sizing, emulsifiers, adhesives and specialty films with high solubility.

Japanese Patent JP 62-33241 (1987), as translated into English, teaches vinyl alcohol copolymers prepared by copolymerizing a vinyl ester such as vinyl acetate and a (alk) acrylamidoalkane sulfonic acid or sulfonate, such as 2-acrylamido-2-methyl propane sulfonate, and saponifying the resulting copolymer.

U.S. Pat. No. 5,340,874, issued to Famili et al. on Aug. 23, 1994, cites Japanese Patent JP 56-73199 as teaching the copolymerization of vinyl acetate with 2-acrylamidopropane sulfonic acid or its metal salts to produce a copolymer which can be saponified to produce a vinyl alcohol polymer with improved flow properties for application in paper coatings, and also cites Japanese Patent JP 63-270,704 as teaching modified polyvinyl alcohols useful as emulsifiers, by copolymerizing N-sulfoalkyl (meth-)acrylamide and a vinyl ester and saponifying the resulting copolymer.

U.S. Pat. No. 539,023, issued to Ikeda on Sep. 20, 1994, discloses vinyl alcohol copolymers having a terminal amino group, useful for preparing resin compositions having good gas barrier properties, produced by copolymerizing a vinyl ester such as vinyl acetate with a comonomer such as acrylamide propane sulfonic acid or its salts, at least partially saponifying the resulting copolymer to produce vinyl alcohol units, and reacting the saponified polymer with a primary or secondary amine, or ammonia.

U.S. Pat. No. 5,507,570 issued to Miller et al. on Oct. 15, 1991, discloses high solids, aqueous, pigmented paper coating compositions containing polyvinyl alcohol.

U.S. Pat. No. 6,166,117 issued to Miyazaki on Dec. 26, 2000, teaches water-soluble films of copolymers of vinyl alcohol and an alkali metal salt of 2-acrylamido-2-methylpropanesulfonic acid which may be formed by melt extrusion.

U.S. Pat. No. 5,051,222, issued to Marten et al. on Sep. 24, 1991, and U.S. Pat. No. 5,137,969, issued to Marten et al. on Aug. 11, 1992, disclose processes for the melt extrusion of polyvinyl alcohol.

SUMMARY OF THE INVENTION

In accordance with this invention, a process is provided for the production of a copolymer of vinyl alcohol (VOH) and 2-acrylamido-2-methyl propane sulfonic acid or a salt of such acid (AMPS) by steps including continuously feeding with agitation, vinyl acetate (VAM) and AMPS as comonomers, a free radical yielding polymerization initiator, and a solvent for said comonomers, initiator, and copolymer resulting from the copolymerization of said comonomers, maintaining the resulting reaction mass in said first reaction zone under polymerization conditions for a residence time sufficient for a major proportion of AMPS fed to said first reaction zone to polymerize, continuously feeding reaction mass from said first reaction zone with an additional supply of AMPS to a second reaction zone, maintaining the reaction mass in the second reaction zone for a residence time sufficient to polymerize a major proportion of the AMPS added to the second reaction zone, continuously withdrawing reaction mass from the second reaction zone, separating copolymer of VAM and AMPS from the latter reaction mass, and saponifying by hydrolysis and/or alcoholyses a major proportion of the acetate groups in said copolymer to form a copolymer of VOH and AMPS. The copolymer is advantageously used in aqueous dispersions and in melt extruded articles as will be appreciated from the discussion which follows.

There is thus provided in one aspect of the invention improved methods of preparing aqueous dispersions selected from drilling fluids, hydraulic cement compositions, mineral pigment containing coatings, and papermaking furnishes as well as improved methods of preparing melt extrudate. The improvement comprises: a) producing a copolymer of vinyl alcohol (VOH) and 2-acrylamido-2-methyl propane sulfonic acid or a salt of such acid (AMPS) by steps including continuously feeding with agitation, vinyl acetate (VAM) and AMPS as comonomers, a free radical yielding polymerization initiator, and a solvent for said comonomers, initiator, and copolymer resulting from the copolymerization of said comonomers, maintaining the resulting reaction mass in said first reaction zone under polymerization conditions for a residence time sufficient for a major proportion of AMPS fed to said first reaction zone to polymerize, continuously feeding reaction mass from said first reaction zone with an additional supply of AMPS to a second reaction zone, maintaining the reaction mass in the second reaction zone for a residence time sufficient to polymerize a major proportion of the AMPS added to the second reaction zone, continuously withdrawing reaction mass from the second reaction zone, separating copolymer of VAM and AMPS from the latter reaction mass, and saponifying by hydrolysis and/or alcoholysis a major proportion of the acetate groups in said copolymer to form a copolymer of VOH and AMPS; and b) incorporating the saponified copolymer into the aqueous dispersion or melt extrudate. The total amount of AMPS fed to both reaction zones is typically about 1 to about 20 wt. % based on the total of VAM and AMPS being fed. The effluent from said second reaction zone preferably has an actual polymer solids content of about 40 to about 85% and the percent conversion calculated from said actual polymer solids content and the theoretical polymer solids content equal to the amount of monomers added to the system is about 70 to about 99%. So also, it is preferred that the relative molecular weight of the VAM/AMPS copolymer obtained from the second reaction zone is indicated by a viscosity of a 15 wt. % solution of the copolymer in methanol of about 4 to about 30 cps.

Preferred saponified copolymers of VOH and AMPS contain about 1 to about 8 mol % of polymerized AMPS (poly AMPS), about 1 to about 20 mol % of polymerized VAM (PVAc) and about 75 to about 98 mol % of polymerized VOH (PVOH), a degree of hydrolysis of about 70 to at least 99% indicated by C13NMR and a relative molecular weight indicated by a viscosity of a 4% aqueous solution of the VOH copolymer of about 3 to about 30 cps.

Another aspect of the invention are improved methods of preparing an aqueous dispersion selected from drilling fluids, hydraulic cement compositions, and pigment coatings including a clay, the improvement comprising: a) preparing a saponified vinyl alcohol resin provided with sulfonic acid functionality by polymerizing vinyl acetate (VAM) and an unsaturated sulfonic acid containing comonomer followed by saponifying by hydrolysis and/or alcoholysis a major proportion of the acetate groups in said copolymer to form a saponified resin of VOH and the sulfonic acid containing comonomer, wherein the saponified polyvinyl alcohol resin consists essentially of recurring units I, II and III,

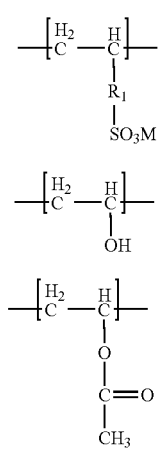

$R_1$ is present or absent and if present is $C_1$-$C_{20}$ alkylene, $C_4$-$C_8$ cycloalkylene, $C_4$-$C_8$ heterocycloalkylene, arylene, heteroarylene, or —C(=O)—NH—$R_2$—; $R_2$ is Cl-$C_{10}$ alkylene, $C_4$-$C_8$ cycloalkylene, $C_4$-$C_8$ heterocycloalkylene, arylene, alkylarylene, heteroarylene, alkylheteroarylene; M is a cationic counterion or hydrogen; and wherein recurring unit I is present in the saponified resin in an amount of from about 0.5 to about 10 mole percent; recurring unit II is present in the resin in an amount of from about 75 to about 98 mole percent and recurring unit III is present in an amount of from about 1 to about 20 mole percent; and b) incorporating the saponified polyvinyl alcohol resin into the aqueous dispersion.

Most preferably, the saponified resin consists essentially of the following recurring units:

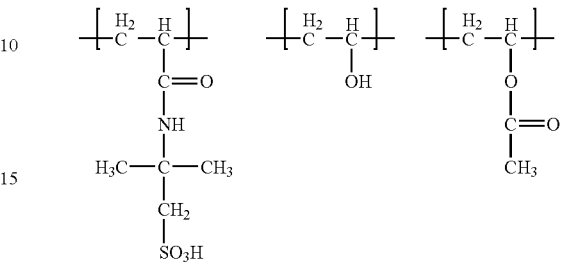

The saponified resin may alternatively consist essentially of the following recurring units:

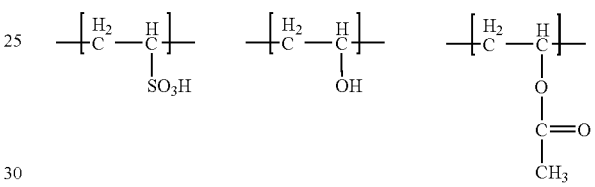

In another alternative embodiment the saponified resin consists essentially of the following recurring units:

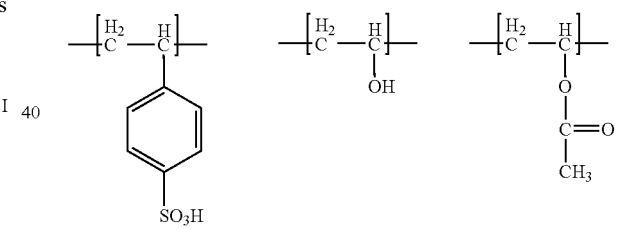

One preferred embodiment is wherein the aqueous dispersion is a drilling fluid, while another is wherein the aqueous dispersion is a hydraulic cement composition, optionally containing a dispersant.

Another preferred embodiment is wherein the aqueous dispersion is a clay containing pigment composition and the pigment composition contains a binder resin. A latex binder resin is preferred in such cases.

Still other features and advantages will become apparent from the discussion which follows.

BRIEF DESCRIPTION OF DRAWINGS

The invention is described in detail below with reference to the Figures in which.

DETAILED DESCRIPTION OF THE INVENTION

Figure 1:
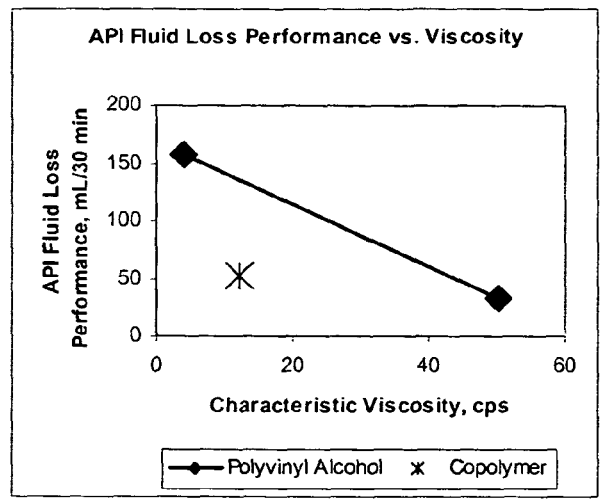
FIG. 1 is a plot of Fluid Loss vs. Viscosity for cement compositions incorporating conventional VOH resins and the VOH/AMPS copolymer of the invention.

The invention is described in detail below in connection with numerous embodiments for purposes of illustration, only. Modifications to particular embodiments within the spirit and scope of the invention, set forth in the appended claims, will be readily apparent to those of skill in the art.

As used herein, terminology has its ordinary meaning unless modified or supplemented by definition here. "Percent" and the like means weight percent unless mole or volume percent is specified, while "ppb" is used to designate parts per barrel (oil field applications). In connection with chemical terminology, specific definitions to be used throughout the specification and claims follow.

"Alkylene" means an alkanediylene group commonly having free valencies on two carbon atoms. Non-limiting examples include methylene, ethylene, propylene and the like. The term also means that the alkylene group may be substituted by one or more substituents which may be the same or different, each substituent being independently selected from the group consisting of halo, alkyl, aryl, -cycloalkyl, cyano, hydroxy, alkoxy, alkylthio, amino, —NH(alkyl), —NH(cycloalkyl), —N(alkyl)$_2$, carboxy and —C(O)O-alkyl.

"Alkylarylene" means an alkyl-aryl-group in which the alkylene and arylene are as described herein. Preferred alkylarylenes comprise a lower alkyl group. A non-limiting example of a suitable alkylarylene groups is tolyl. The bond to the parent moiety is through the arylene.

"Alkylheteroarylene" means an alkyl group attached to a parent moiety via a heteroarylene group;

"Arylene" means an aromatic monocyclic or multicyclic ring system comprising about 6 to about 14 carbon atoms, preferably about 6 to about 10 carbon atoms. The arylene group can be unsubstituted or substituted on the ring with one or more substituents which may be the same or different, each being independently selected from the group consisting of alkyl, aryl, —OCF$_3$, —OCOalkyl, —OCOaryl, —CF$_3$, heteroaryl, aralkyl, alkylaryl, heteroaralkyl, alkylheteroaryl, hydroxy, hydroxyalkyl, alkoxy, aryloxy, aralkoxy, acyl, aroyl, halo, haloalkyl, haloalkoxy, nitro, cyano, carboxy, alkoxycarbonyl, aryloxy-carbonyl, aralkoxycarbonyl, alkylsulfonyl, arylsulfonyl, heteroarylsulfonyl, alkylsulfinyl, arylsulfinyl, heteroarylsulfinyl, alkylthio, arylthio, heteroarylthio, aralkylthio, heteroaralkylthio, -cycloalkyl and heterocyclyl. Non-limiting examples of suitable aryl groups include phenyl and naphthyl. The "aryl" group can also be substituted by linking two adjacent carbons on its aromatic ring via a combination of one or more carbon atoms and one or more oxygen atoms such as, for example, methylenedioxy, ethylenedioxy, and the like.

"Cycloalkylene" means a non-aromatic mono- or multicyclic ring system comprising about 3 to about 10 carbon atoms, preferably about 5 to about 10 carbon atoms. Preferred cycloalkylene rings contain about 5 to about 7 ring atoms. The cycloalkylene can be optionally substituted on the ring by replacing an available hydrogen on the ring by one or more substituents which may be the same or different, each being independently selected from the group consisting of alkyl, aryl, heteroaryl, aralkyl, alkylaryl, aralkenyl, heteroaralkyl, alkylheteroaryl, heteroaralkenyl, hydroxy, hydroxyalkyl, alkoxy, aryloxy, aralkoxy, acyl, aroyl, halo, nitro, cyano, carboxy, alkoxycarbonyl, aryloxycarbonyl, aralkoxycarbonyl, alkylsulfonyl, arylsulfonyl, heteroarylsulfonyl, alkylsulfinyl, arylsulfinyl, heteroarylsulfinyl, alkylthio, arylthio, heteroarylthio, aralkylthio, heteroaralkyl-thio, cycloalkyl, cycloalkenyl and heterocyclyl.

"Heteroarylene" means an aromatic monocyclic or multicyclic ring system comprising about 5 to about 14 ring atoms, preferably about 5 to about 10 ring atoms, in which one or more of the ring atoms is an element other than carbon, for example nitrogen, oxygen or sulfur, alone or in combination. Preferred heteroarylenes contain about 5 to about 6 ring atoms. The "heteroarylene" can be optionally substituted on the ring by replacing an available hydrogen on the ring by one or more substituents which may be the same or different, each being independently selected from the group consisting of alkyl, aryl, heteroaryl, aralkyl, alkylaryl, aralkenyl, heteroaralkyl, alkylheteroaryl, heteroaralkenyl, hydroxy, hydroxyalkyl, alkoxy, aryloxy, aralkoxy, acyl, aroyl, halo, nitro, cyano, carboxy, alkoxycarbonyl, aryloxycarbonyl, aralkoxycarbonyl, alkylsulfonyl, arylsulfonyl, heteroarylsulfonyl, alkylsulfinyl, arylsulfinyl, heteroarylsulfinyl, alkylthio, arylthio, heteroarylthio, aralkylthio, heteroaralkylthio, -cycloalkyl, cycloalkenyl and heterocyclyl.

"Heterocycloalkylene" represents a cycloalkylene ring as defined above, having one or more (e.g., 1, 2 or 3) heteroatoms independently selected from: O, S, or —NR$^3$— wherein R$^3$ is selected from: H, alkyl, aryl, heteroaryl, aralkyl (e.g., ar(C$_1$ to C$_6$)alkyl), or heteroaralkyl (e.g., heteroar(C$_1$ to C$_6$)alkyl.

"Characteristic Viscosity" of a resin is measured in 4% w/w solution at 20° C.

"Dispersion", "aqueous dispersion" and the like refers to a solution, slurry or a suspension containing at least some undissolved or partially dissolved components such as minerals, cellulosic material and so forth.

"PVOH/AMPS copolymer", "PVOH-co-AMPS" and like terminology means hydrolyzed copolymers of VAM and AMPS as described herein. These polymers preferably have a characteristic viscosity of between about 2 and 20 cps and have an AMPS content of from 1 mole % to 5 mole percent, most preferably 2 to 4 mole %. A preferred PVOH/AMPS copolymer has a characteristic viscosity of 12 and an AMPS content of about 4 mole %.

In carrying out the foregoing process the comonomer with VAM may be the free acid form of AMPS or the sodium, potassium, or ammonium salt of such free acid form.

The free radical yielding polymerization initiator utilized for the copolymerization of VAc and AMPS or salt of AMP may be, for example, 2-ethylhexyl peroxydicarbonate (Trigonox EHP), 2,2'-azobisisobutyronitrile (AIBN), t-butyl peroxyneodecanoate, bis(4-t-butylcyclohexyl)peroxydicarbonate, di-n-propyl peroxydicarbonate, di-n-butyl peroxydicarbonate, di-cetyl peroxydicarbonate, di-s-butyl peroxydicarbonate. Essentially any initiator able to generate free radicals can be used.

Optionally, acetaldehyde (AcH) as a chain transfer agent can be continuously fed to the first reaction zone with the other components. The amount of AcH may, for example, be up to about 0.2 wt. % based on the total of VAM and AcH being added.

A solvent for the comonomers VAM and AMPS, the polymerization initiator and the copolymer being formed in the two reaction zones is generally employed in the process. Suitable solvents are, for example, methanol, ethanol, and propanol. The preferred solvent is methanol.

The amount of AMPS continuously fed to both reaction zones is, for example, about 1 to about 20 wt. %, preferably about 4 to 15 wt. % based on the total of VAM and AMPS being fed. The "split" or ratio between the amounts of AMPS fed to the first and second reaction zones, respectively, may be, for example, from about 55:45 to about 80:20.

The amount of polymerization initiator fed to the first reaction zone may be, for example, about 0.0001 to about 1 wt. % based on the weight of VAM being fed.

The amount of solvent fed to the first reaction zone may be, for example, about 10 to about 40 wt. % based on the weight of VAM being fed. The polymerization initiator is preferably fed to the first reaction zone as a solution in the solvent at a concentration in the solvent of about 0.1 to about 10 wt. % based on the weight of the solution.

The average residence time in the first reaction zone of the components fed to the first reaction zone may be, for example, in the range of about 30 to about 120 minutes, preferably about 45 to about 70 minutes.

The reaction temperature in the first reaction zone is, for example, about 55 to about 85° C., preferably about 60 to about 80° C.

The average residence time in the second reaction zone of the components in the effluent from the first reaction one and the additional AMPS fed to the second reaction zone may be, for example, in the range of about 30 to about 120 minutes, preferably about 45 to about 70 minutes.

The reaction temperature in the second reaction zone may be, for example, about 55 to about 85° C., preferably about 60 to about 80° C.

The pressure in each reaction zone may be in the range, for example, of about 1 to about 30 psi, preferably about 3 to about 15 psi.

The residence times and temperatures in the first and second reaction zones are generally sufficient to result in the polymerization of substantially all of the AMPS fed to the system although a small percentage of VAM added to the system may remain unpolymerized.

The polymer solids content in the effluent from the second reaction zone may be, for example, in the range of about 40 to about 85%, preferably about 55 to about 75%, while the percent conversion calculated from actual polymer solids content and the theoretical polymer solids content equal to the amount of monomers added may be in the range of about 70 to about 99%, preferably about 80 to about 98%. The molecular weight of the copolymer from the second reaction zone indicated by the viscosity of a 15 wt. % solution in methanol is in the range, for example, of about 4 to about 200 cps preferably about 7 to about 30 cps.

In carrying out the saponification step resulting in VOH/AMPS copolymers, the effluent from the second reaction zone may, for example, be fed to a stripping column to remove the more volatile components such as unreacted VAM from the copolymer of VAM and AMPS. The resulting "paste" is then mixed with an aqueous solution of a strong base such as sodium hydroxide, e.g., containing about 10 to about 50 wt. % of sodium hydroxide to provide base at a caustic mole ratio (CMR, ratio of moles of base to moles of acetate in the copolymer) of about 0.01 to about 0.1. Optionally, an amount of a volatile alcohol, e.g., methanol, is also added to reduce the solids content in the paste to about 30 to about 65 wt. %. The resulting mass is then allowed to react at a temperature from about room temperature (RT, about 22° C.), to about 50° C. for a period, e.g., about 5 minutes to about 24 hours to obtain a percent hydrolysis of the acetate groups in the copolymer to hydroxyl groups, e.g., in the range of about 70 to about 99+%, preferably in the range of about 80 to about 95%.

The saponified copolymer of VOH and AMPS may have, for example, about 1 to about 8 mol % of polymerized AMPS (poly AMPS), about 1 to about 20 mol % of polymerized VAM (PVAc) and about 75 to about 98 mol % of polymerized vinyl alcohol (PVOH), preferably about 2 to about 4 mol % of poly AMPS, about 5 to about 10 mol % of PVAc, and about 85 to about 95 mol % of PVOH, a degree of hydrolysis of, for example, about 70 to about 99+%, preferably about 80 to about 95% indicated by $C^{13}$NMR and a relative molecular weight indicated by the viscosity of a 4% aqueous solution of the VOH copolymer of, for example, about 3 to about 30 cps, preferably about 7 to about 10 cps.

The following examples further illustrate the invention. Examples 1-11 describe the preparation of copolymers of VAM and the sodium salt of a copolymer of 2-acrylamido-2-methyl propane sulfonic propane sulfonic acid (SAMPS) by a continuous process under varying process conditions.

Polymerizations were performed using two jacketed 2-L glass reactors in series fitted with reflux condensers, mechanical stirrers and feed lines. Reactor 1 was fed continuously with vinyl acetate (VAM), which, in some examples, contained acetaldehyde (AcH), methanol containing di(ethylhexyl) peroxy dicarbonate (EHP) initiator, and SAMPS, each as a separate feed line using metering pumps. To ensure accurate feedrates, each feed was placed on a balance and the feedrates checked by measuring the weight difference with time. SAMPS was also fed continuously to the second reactor to minimize compositional drift (the split between Reactor 1 and Reactor 2 was 75:25). Table 1 lists the feedrates and initiator and aldehyde concentrations for the runs. Reactor 1 temperature was 60° C. and Reactor 2 temperature was 64° C. The residence time was 1 hour in each reactor. The polymer solution coming out of Reactor 2 was fed into an Oldershaw column to remove residual vinyl acetate using methanol vapors. Each run was 12 hours long to ensure the polymerization was lined-out.

TABLE 1

Feedrates for the Continuous Polymerization Runs

Concentration, wt. %

| Example | % EHP in MeOH | % AcH in VAM | Feedrate, g/min VAM/AcH | SAMPS | MeOH/EHP |
|---|---|---|---|---|---|
| 1 | 4.11 | 0 | 15.69 | 1.08 | 5.73 |
| 2 | 6.98 | 0 | 16.63 | 2.29 | 3.58 |
| 3 | 1.41 | 0 | 15.07 | 2.08 | 5.35 |
| 4 | 4.11 | 0 | 14.97 | 2.06 | 5.46 |
| 5 | 4.11 | 1.96 | 15.07 | 2.04 | 5.39 |
| 6 | 2.44 | 0 | 17.66 | 1.22 | 3.62 |
| 7 | 2.44 | 1.96 | 16.84 | 2.28 | 3.38 |
| 8 | 1.41 | 1.96 | 15.89 | 1.07 | 5.53 |
| 9 | 6.98 | 1.96 | 17.6 | 1.19 | 3.71 |
| 10 | 3.51 | 0.99 | 16.25 | 1.66 | 4.59 |
| 11 | 3.51 | 0.99 | 16.25 | 1.66 | 4.59 |

Table 2 indicates the results from the polymerization of SAMPS with vinyl acetate in the examples, including relative molecular weight of the polymer indicated by the viscosity of a 15% solution methanol, the actual percentage of solids in Reactor 2 and the percent conversions (figures in parentheses) calculated from the actual percent solids and theoretical percent solids (figures not in parentheses).

TABLE 2

Results From the Polymerization of SAMPS With Vinyl Acetate

| Example | 15% viscosity, cps | Reactor 2 solids | Theoretical solids (Conversion) |
|---|---|---|---|
| 1 | 7.3 | 72.4% | 74% (97.84%) |
| 2 | 8.9 | 79.80% | 83.65% (95.4%) |
| 3 | 13.5 | 70% | 75% (93%) |
| 4 | 7.3 | 6840% | 74.89 (91.33%) |
| 5 | 5.1 | 65.80% | 75.24% (87.45%) |
| 6 | 15.7 | 77.60% | 83.63% (92.79%) |
| 7 | 8.8 | 69.70% | 84.41% (82.57%) |
| 8 | 7.2 | 63% | 74.96% (84.04%) |
| 9 | 6.3 | 77.30% | 83.40% (92.59%) |
| 10 | 7 | 70.20% | 79.07% (88.78%) |
| 11 | 7.8 | 70.80% | 79.07% (89.55%) |

Table 2 shows the overall conversion of vinyl acetate and SAMPS into polymer. Based on these theoretical solids levels, which are directly related to the conversion of monomers to copolymer, the conversions range from 83% to 98%. No residual SAMPS were detected by $C^{13}$NMR in any of the runs.

Saponification of the VAM/SAMPS copolymers was accomplished by treating the paste obtained from the Oldershaw column used to strip VAM from the effluent from Reactor 2 with 50 wt. % aqueous NaOH at various values of caustic mole ratio (CMR) further diluted with methanol so that the solids content was 35 wt. %. Examples 12-17 illustrate the effect of varying conditions of saponification carried out on the VAM/SAMPS copolymer of Example 3, with the results shown in Table 3.

TABLE 3

Saponification of PVAc-AMPS

| Example | CMR | Time of saponification | Temp of saponification | % hydrolysis | Target hydrolysis |
|---|---|---|---|---|---|
| 12 | 0.035 | 17 hours | RT C. | 96.45 | 99 |
| 13 | 0.045 | 17 hours | 40 C. | Ca. 97 | 99 |
| 14 | 0.03 | 17 hours | RT C. | 95.80 | 95 |
| 15 | 0.01 | 2 hours | RT C. | 84.62 | 88 |
| 16 | 0.01 | 2 hours | RT C. | 81.40 | 88 |
| 17 | 0.015 | 2.5 hours | RT C. | 92.60 | 88 |

RT = room temperature

Caustic mole ratio (CMR) was calculated with the assumption the polymer is 100% PVAc. The small amount of co-AMPS was ignored in the CMR calculation.

As stated, the 50% NaOH was diluted with enough MeOH when added to the paste to dilute the solids to 35%. The NaOH/MeOH was mixed into the paste by hand (10 to 20 min. of mixing) at room temperature. The 40 C saponification gelled after about 1 minute of mixing. The paste was then allowed to react for the time and temperature shown in the above table. Saponification procedures similar to those described in Examples 12-17 were carried out on the polymers of Examples 1-11.

Table 4 shows the compositions and properties of the saponified polymers for each of the examples of Tables 1 and 2 including mol percents of polymerized SAMPS (SAMPS), polymerized VAM (PVAc) and polymerized vinyl alcohol (PVOH), degree of hydrolysis indicated by $C^{13}$NMR, relative molecular weight as indicated by the viscosity of a 4% solution in water and degree of hydrolysis indicated by titration.

TABLE 4

Composition of Copolymer and Final Viscosity

| | Composition of Saponified Polymer by $C^{13}$NMR | | | | Final Results | |
|---|---|---|---|---|---|---|
| Example | SAMPS, mol % | PVAc, mol % | PVOH, mol % | Degree of hydrolysis, % ($C^{13}$NMR) | 4% viscosity, cps | Degree of hydrolysis, % (titration) |
| 1 | 1.31 | 4.44 | 94.25 | 95.5 | 3.92 | 95.65 |
| 2 | 2.87 | 2.48 | 94.65 | 97.45 | 4.37 | 96.68 |
| 3 | 3.39 | 2.46 | 94.15 | 97.46 | 5 | 98.91 |
| 4 | 3.42 | 1.52 | 95.06 | 98.43 | 3.94 | 96.24 |
| 5 | 3.12 | 2.42 | 94.46 | 97.5 | 2.59 | 98.41 |
| 6 | 1.48 | 2.09 | 95.53 | 96.96 | 6.11 | 97.43 |
| 7 | 2.83 | 2.23 | 94.94 | 97.7 | 3.71 | 98.37 |
| 8 | 1.6 | 1.26 | 97.14 | 98.72 | 3.58 | 98.91 |
| 9 | 1.54 | 1.31 | 97.15 | 98.67 | 2.97 | 98.72 |
| 10 | 2.03 | 1.79 | 96.18 | 98.17 | 3.53 | 98.47 |
| 11 | 2.07 | 2.45 | 95.48 | 97.49 | 3.78 | 97.85 |

$C^{13}$NMR spectroscopy was used to determine the copolymer composition and the randomness of the SAMPS in the copolymer. The SAMPS feedrate was the only variable to control the SAMPS loading in the copolymer.

The date in Tables 1-4 indicates that copolymers of VOH and AMPS can be obtained at relatively high AMPS loadings, high conversion rates and productivity, high degree of hydrolysis and relatively low compositional drift, using the continuous process of this invention.

More generally, the invention includes a continuous process for making vinyl acetate/acrylamide or acrylamide derivative copolymers. Acrylamide or acrylamide derivative monomers and copolymers incorporating them are referred to herein as acrylamido comonomers and acrylamido copolymers, respectively, for purposes of convenience. There is thus provided in accordance with the invention a continuous process for making a vinyl acetate/acrylamido copolymer comprising: (a) continuously supplying a reaction mixture including vinyl acetate and a more reactive acrylamido comonomer to a reaction zone wherein the vinyl acetate and acrylamido comonomer are at least partially consumed to form an intermediate reaction mixture; (b) continuously supplying to the intermediate reaction mixture a stream enriched with respect to the more reactive acrylamido comonomer and copolymerizing the additional acrylamido comonomer with the intermediate reaction mixture to form a vinyl acetate/acrylamido copolymer product; and (c) continuously recovering the vinyl acetate/acrylamido copolymer product. The invention also relates to improved drilling fluids, cement compositions, clay pigment dispersions, papermaking furnishes, melt extruded articles and the like as described hereinafter.

The polymers prepared as above are superior additives and film formers for a variety of applications including drilling fluids, hydraulic cement compositions, pigment compositions, papermaking furnishes and so forth. Their performance and suitability for use in a broad range of aqueous dispersions is due, in part, to enhanced salt stability as noted below. It has also been found that the resins are suitable for melt extrusion into water soluble films and shaped articles.

Salt Stability

A series of solutions were prepared and tested for stable solubility in brines such as are encountered in oil field applications or other dispersions. Stability of the polymer solute to salt is important in a variety of applications. The 4% AMPS VOH/AMPS copolymer performed better than Celvol® VAM homopolymers as is seen from the data which follows. Celvol® 513 is 86-89% hydrolyzed and has a Characteristic Viscosity of 13-15; Celvol® 540 is 87-89% hydrolyzed and has a Characteristic Viscosity of 45-55.

Details of testing appear in the tables which follow.

Oil Field Brines in General

TABLE 5

General Oil Field Brine Testing Procedure 0.1 lb polymer/bbl = 0.29 g polymer/L
100 mL of brine solution was dded to a glass jar
and stirred with a magnetic stirrer (300 rpm). The
following solutions were made:
   7 wt % Celvol 540
15.2 wt % VOH/AMPS Copolymer
   8.9 wt % Celvol 513
Added the polymer solutions drop wise to the brine
solutions and stirred at room temperature.

TABLE 6

Salt Solubility

| | 0.1 lb/bbl | | | 0.2 lb/bbl | | |
|---|---|---|---|---|---|---|
| | VOH/AMPS Copolymer | Celvol 513 | Celvol 540 | VOH/AMPS Copolymer | Celvol 513 | Celvol 540 |
| 26% NaCl brine | S | x | x | S | x | x |
| 26% KCl brine | S | x | x | s | x | x |
| 31% Halide brine | S | x | x | s | x | x |
| 37% Sodium Formate brine | X | x | x | x | x | x | s = soluble
x = not soluble

TABLE 7

Salt Solubility

| | 0.3 lb/bbl | | | 0.4 lb/bbl | | |
|---|---|---|---|---|---|---|
| | VOH/AMPS Copolymer | Celvol 513 | Celvol 540 | VOH/AMPS Copolymer | Celvol 513 | Celvol 540 |
| 26% NaCl brine | x | X | X | x | x | x |
| 26% KCl brine | s | X | X | s | x | X |
| 31% Halide brine | s | X | X | x | x | X |
| 37% Sodium Formate brine | x | X | X | x | x | X | s = soluble
x = not soluble

TABLE 8

Salt Solubility

| | 0.5 lb/bbl | | |
|---|---|---|---|
| | VOH/AMPS Copolymer | Celvol 513 | Celvol 540 |
| 26% NaCl brine | X | x | x |
| 26% KCl brine | X | x | x |
| 31% Halide brine | X | x | x |
| 37% Sodium Formate brine | X | x | x | s = soluble
x = not soluble

The Celvols precipitated on contact.
VOH/AMPS Copolymer, when added as a solution, would dissolve in the lower concentration brines Seawater

TABLE 9

Seawater Testing 5 wt % solutions of VOH/AMPS Copolymer glass jars and stirred using a magnetic stirrer at 450 to 550 rpms. The test was conducted at room temperature. Sea salt (aquarium salt) was added in small portions to each solution and the results recorded.

Not only did the VOH/AMPS Copolymer show better solubility but also it took less time to dissolve the salt into the solution.

Specific Salts

TABLE 11

Procedure for Specific Salts

Made 5 wt % solutions of VOH/AMPS Copolymer, Celvol 513 and Celvol 540. 75 g of each solution was put in to separate glass jars and stirred with a magnetic stirrer at 450 to 550 rpms. The test was conducted at room temperature. Each salt was added in small portions to each solution and the results recorded.

TABLE 10

Sea Salt Stability

| Sea Salt | VOH/AMPS Copolymer | | 513 | | 540 | |
| --- | --- | --- | --- | --- | --- | --- |
| | Addition (g) | Time to Dissolve (min) | Addition (g) | Time to Dissolve (min) | Addition (g) | Time to Dissolve (min) |
| | 0.4740 | 0:10 | 0.3867 | 21:31 | 0.2350 | not soluble |
| | 0.5926 | 2:43 | 0.3404 | 7:49 | | |
| | 0.5521 | 2:28 | 0.4106 | 18:59 | | |
| | 0.6400 | 6:58 | 0.3230 | 40:00 | | |
| | 0.3057 | 3:51 | 0.3407 | 41:00 | | |
| | 0.4644 | 5:48 | 0.7212 | 31:00 | | |
| | 0.7364 | 3:21 | — | — | | |
| | 0.9912 | 45:00 | — | — | | |
| Total | 4.7564 | | 2.5226 | | | |
| Solution wt (5 wt %) grams of polymer | 75.00 | | 75.00 | | | |
| | 3.75 | | 3.75 | | | |
| Ending solution ratio | | | | | | |
| wt % polymer | 4.7 | | 4.8 | | | |
| wt % salt | 6.0 | | 3.3 | | | |

TABLE 12

NaCl Stability

| NaCl | VOH/AMPS Copolymer | | 513 | | 540 | |
|---|---|---|---|---|---|---|
| | Addition (g) | Time to Dissolve (min) | Addition (g) | Time to Dissolve (min) | Addition (g) | Time to Dissolve (min) |
| | 0.9855 | 0:15 | 1.0497 | 12:00 | 1.0473 | 10:00 |
| | 1.0274 | 0:15 | 1.0600 | 12:00 | 0.9922 | 12:00 |
| | 1.0668 | 0:30 | 1.0360 | 8:00 | 1.051 | 15:00 |
| | 1.0382 | 0:30 | 1.8068 | 8:00 | 1.016 | 20:00 |
| | 1.0711 | 0:30 | 1.0375 | 20:00 | 1.243 | 20:00 |
| | 0.9944 | 0:30 | 0.9671 | 15:00 | 1.1328 | 13:00 |
| | 0.9683 | 0:30 | | | | |
| | 1.1828 | 0:50 | | | | |
| | 1.1380 | 0:50 | | | | |
| Total Solution wt (5 wt %) | 9.4725 74.56 | | 6.9571 75.61 | | 6.4823 74.23 | |
| grams of polymer Ending solution ratio | 3.728 | | 3.78 | | 3.71 | |
| wt % polymer | 4.4 | | 4.6 | | 4.6 | |
| wt % salt | 11.3 | | 8.4 | | 8.0 | |

TABLE 13

KCl Stability

| KCl | VOH/AMPS Copolymer | | 513 | | 540 | |
|---|---|---|---|---|---|---|
| | Addition (g) | Time to Dissolve (min) | Addition (g) | Time to Dissolve (min) | Addition (g) | Time to Dissolve (min) |
| | 1.0532 | 0:20 | 1.0593 | 5:00 | 1.2947 | 10:00 |
| | 1.0699 | 0:25 | 0.9630 | 6:00 | 1.1258 | 10:00 |
| | 1.1024 | 0:50 | 1.1129 | 5:00 | 1.2235 | 12:00 |
| | 1.1761 | 0:50 | 1.1096 | 6:00 | 1.3129 | 10:00 |
| | 1.1757 | 0:50 | 1.1253 | 5:00 | 1.1005 | 11:00 |
| | 1.1142 | 0:50 | 1.1605 | 8:00 | 1.0888 | 11:00 |
| | 1.1517 | 0:50 | 1.1670 | 8:00 | | |
| | 1.1242 | 1:30 | | | | |
| | 1.1799 | 2:00 | | | | |
| | 1.1422 | 2:00 | | | | |
| | 1.1514 | 2:00 | | | | |
| | 1.1566 | 2:00 | | | | |
| | 1.113 | 2:00 | | | | |
| Total Solution wt (5 wt %) | 14.7105 74.61 | | 6.5306 75.61 | | 7.1462 74.23 | |
| grams of polymer Ending solution ratio | 3.7305 | | 3.78 | | 3.71 | |
| wt % polymer | 4.2 | | 4.6 | | 4.6 | |
| wt % salt | 16.5 | | 8.0 | | 8.8 | |

TABLE 14

KCl Results

With each addition of KCl the Celvol material would precipitate then redissolve. The VOH/AMPS Copolymer material did not precipitate.
After sitting overnight the Celvol 513 material developed 2 layers, the others did not.

TABLE 15

NaBr Stability

| NaBr | VOH/AMPS Copolymer | | 513 | | 540 | |
|---|---|---|---|---|---|---|
| | Addition (g) | Time to Dissolve (min) | Addition (g) | Time to Dissolve (min) | Addition (g) | Time to Dissolve (min) |
| | 1.0743 | 0:40 | 1.0375 | 0:20 | 1.0741 | 0:20 |
| | 1.1307 | 0:20 | 1.1207 | 0:20 | 1.2856 | 0:20 |
| | 1.3696 | 0:20 | 1.3853 | 0:20 | 1.3941 | 0:25 |
| | 1.0677 | 0:25 | 1.0571 | 0:25 | 1.2050 | 0:25 |
| | 1.0802 | 0:25 | 1.1923 | 0:25 | 1.1344 | 0:25 |
| | 1.2445 | 0:25 | 1.1918 | 0:25 | 1.2070 | 0:25 |
| | 1.2680 | 0:20 | 1.2645 | 0:20 | 1.2602 | 0:20 |
| | 1.3168 | 0:30 | 1.3631 | 0:25 | 1.3566 | 0:25 |
| | 1.0718 | 0:40 | 1.1192 | 0:25 | 1.0198 | 0:25 |
| | 1.1333 | 0:35 | 1.1680 | 0:45 | 1.1281 | 0:30 |
| | 1.2240 | 0:25 | 1.2190 | 0:25 | 1.1995 | 0:25 |
| | 1.6747 | 0:40 | 1.2304 | 0:30 | 1.0786 | 0:30 |
| | 1.1744 | 0:30 | 1.2587 | 0:30 | 1.1840 | 0:30 |
| | 1.1873 | 0:40 | 2.1185 | 0:35 | 0.8637 | 0:35 |
| | 2.8492 | 0:25 | 2.8487 | 0:25 | 2.1995 | 1:00 |
| Total | 19.8665 | | 20.5748 | | 18.5902 | |
| Solution wt (5 wt %) | 75.00 | | 75.78 | | 74.50 | |
| grams of polymer Ending solution ratio | 3.75 | | 3.79 | | 3.73 | |
| wt % polymer | 4.0 | | 3.9 | | 4.0 | |
| wt % salt | 20.9 | | 21.4 | | 20.0 | |

TABLE 16

NaBr Results

No precipitate formed with NaBr additions. The solution remained clear through-out the entire addition of NaBr. This is very different compared to the other salts.

TABLE 17

Sodium Formate Stability

| Sodium Formate | VOH/AMPS Copolymer | | 513 | | 540 | |
|---|---|---|---|---|---|---|
| | Addition (g) | Time to Dissolve (min) | Addition (g) | Time to Dissolve (min) | Addition (g) | Time to Dissolve (min) |
| | 1.0557 | 4:20 | 1.0019 | 10:00 | 1.0676 | 10:00 |
| | 0.5377 | 6:00 | 0.5227 | 9:00 | 0.5285 | 8:00 |

TABLE 17-continued

Sodium Formate Stability

| | VOH/AMPS Copolymer | | 513 | | 540 | |
|---|---|---|---|---|---|---|
| Sodium Formate | Addition (g) | Time to Dissolve (min) | Addition (g) | Time to Dissolve (min) | Addition (g) | Time to Dissolve (min) |
| | 0.5249 | 5:00 | 0.5175 | 10:00 | 0.5454 | 10:00 |
| | 1.0283 | 6:00 | 1.0413 | 10:00 | 1.0567 | 10:00 |
| | 1.0757 | 6:00 | 1.0219 | 11:00 | 1.0331 | 15:00 |
| | 1.0636 | 6:00 | | | | |
| | 1.1584 | 11:00 | | | | |
| | 1.1650 | 20:00 | | | | |
| Total | 7.6093 | | 4.1053 | | 4.2313 | |
| Solution wt | 74.99 | | 75.82 | | 75.11 | |
| (5 wt %) grams of polymer Ending solution ratio | 3.75 | | 3.79 | | 3.76 | |
| wt % polymer | 4.5 | | 4.7 | | 4.7 | |
| wt % salt | 9.2 | | 5.1 | | 5.3 | |

TABLE 18

Sodium Formate Results

With each addition of sodium formate all materials formed a precipitate then redissolve. Time to dissolve depended greatly on the size of the precipitated particles. All the polymers were most sensitive to this salt.

The polymers of the invention exhibit superior resistance to brine and are thus suitable for oil field and other applications where brines are encountered.

Drilling Fluid

Drilling fluids for oilfield applications fulfill a variety of requirements, satisfying oftentimes potentially conflicting performance criteria, such a low fluid loss and high lubricity. A drilling fluid performs the following functions: removes cuttings from the bottom of the hole and carries them to the surface; holds cuttings and weight material in suspension when circulation is interrupted; releases sand and cuttings at the surface; walls the hole with an impermeable cake; minimizes adverse effects upon the formation; cools and lubricates the bit and drill string; supports part of the weight of the drill stem and casing; controls subsurface pressure; transmits hydraulic horsepower; maximizes down hole information obtained; transmits electronic data from down hole tools; help preserve and protect the drill string and casing. To this end, the fluids contain many components, including dissolved salts which can adversely affect fluid loss additives. Also, different fluids may operate best at different pH values which can also affect stability of the fluid composition. Temperature requirements can be quite demanding, requiring that a component maintain properties at elevated temperatures. U.S. Pat. No. 4,526,693 to Sun et al. and U.S. Pat. No. 6,730,637 to Stewart et al. disclose drilling fluids. Generally speaking, a drilling fluid of this invention includes a polyvinyl alcohol-sulfonic acid resin of the invention in a composition as a fluid loss additive or other modifier to the drilling composition with other suitable components. In some embodiments, the composition may include, in any combination, (i) weighting agents such as barite, hematic, calcium carbonate, galena, siderite and mixtures thereof, to adjust the density of the drilling fluid; (ii) an organophilic clay such as hectorite, bentonite and mixtures thereof as a viscosifier and gelling agent; (iii) lime; and (iv) emulsifiers and wetting agents such as surfactants, ionic surfactants such as fatty acids, amines, amides and organic sulphonates and mixtures thereof. Drilling fluid may be prepared by admixing from about 10 to about 70 ppb (parts per barrel herein) of ammonium chloride with an aqueous fluid until a substantial portion of the ammonium chloride dissolves. The aqueous fluid can comprise fresh water, formation water, brine or the like. Preferably, the aqueous fluid comprises fresh water; however fresh water is not always available in sufficient quantities. A quantity of from about 65 to about 150 ppb of sodium chloride then is admixed with the aqueous fluid. The quantity of sodium chloride necessary to saturate the fluid at the existing aqueous fluid temperature dissolves and the remainder remains suspended in the fluid. The undissolved remainder will provide salt necessary to saturate the aqueous fluid at higher temperature levels which may occur during use of the aqueous fluid in drilling operations. In instances in which the aqueous fluid comprises a brine, lesser quantities of sodium chloride will be required to provide a total concentration in the designated range.

Upon dissolution of a substantial portion of the salts, a viscosifying agent comprising prehydrated bentonite, attapulgite, sepiolite or the like is optionally admixed with the aqueous solution. Sufficient viscosifying agent is admixed with the aqueous solution to provide a concentration of from about 5 to about 30 ppb of the drilling fluid. While the viscosifying agent provides some fluid-loss control, it is desirable to admix a selected fluid-loss control agent with the fluid to enhance the rheological properties of the fluid. The fluid-loss control agent comprises a resin of the invention alone or in combination with another polymer such as, for example, PVOH homopolymer resin or a cellulose derivative such as carboxymethylcellulose, a starch, a vinylamide/vinylsulfonate polymer or the like as well as suitable mixtures thereof.

The fluid-loss control agent of the invention is generally is admixed with the fluid in an amount in the range of from about zero to about 20 ppb. The fluid also can be admixed with a quantity of diesel oil or the like to form an emulsion which also functions to reduce fluid loss. If a quantity of a hydrocarbon is admixed with the aqueous drilling fluid, the hydrocarbon can be present in an amount of from about 0 to about 30 percent of the total fluid volume.

Preferably, a pH control and rheology stabilizing agent is admixed with the drilling fluid, however, such agent is not required by the composition of the present invention. One preferred pH-control and rheology-control agent is ferrous gluconate. The ferrous gluconate buffers the pH of the fluid against rapid pH change over a wide pH range and stabilizes the fluid by reducing the possibility of free ammonia generation as a result of pH excursions. The ferrous gluconate also provides some corrosion protection to the well bore tubular goods by complexing any hydrogen sulfide present in the drilling fluid. The ferrous gluconate generally is admixed with the fluid in an amount of from about zero to about 10 ppb.

The pH of the drilling fluid is adjusted to provide a pH in the range of from about 5.0 to 9.0 and, preferably, from about 7.0 to 9.0. The pH adjustment normally is accomplished by the addition of an alkaline agent such as sodium hydroxide or the like. The presence of ferrous gluconate in the drilling fluid effectively neutralizes any increased potential for corrosion which results from the slightly acid pH range of the fluid. At a pH in excess of 9.5, free ammonia gas can be liberated from the drilling fluid. This is undesirable because it will result in a substantial change in the rheological properties of the drilling fluid and is potentially hazardous to any personnel exposed to the gas.

A corrosion agent also can be admixed with the drilling fluid to provide additional corrosion protection. The corrosion agent can comprise a quaternary amine salt such as, for example, an alkylbenzyl pyridine quat, alkylpolyoxy-ethylenebenzylammonium chloride, imidazoline complexes with fatty acids or the like compounds which are well known to individuals skilled in the art.

A weighting agent then is admixed with the drilling fluid in an amount sufficient to produce a fluid having a weight in the range of from about 8.5 to about 18 pounds per gallon. The weighting agent can comprise barite, iron oxide such as hematite, galena, siderite or any other material which is capable of weighting a drilling fluid.

Drilling fluids of the invention were prepared and tested as set forth in the following tables. Fluid loss was tested at room temperature (API Specification 10) and high pressure, high temperature. Plastic Viscosity was tested before and after hot rolling with shale in ajar. Results indicated the dispersions of the invention were stable to shale; that is, hot rolling did not cause a large viscosity increase which indicates instability.

Results are summarized in Table 19; Details appear in Tables 20 and 21.

TABLE 19

Summary of Drilling Fluid Results

| VOH/AMPS | Fresh water | | | Salt water | | |
|---|---|---|---|---|---|---|
| Copolymer level, % of solids | 0 | 1 | 4 | 0 | 1 | 4 |
| Plastic Viscosity (initial)*, cps | 7 | 15 | 15 | 10 | 10 | 11 |
| Plastic Viscosity (after hot rolling for 16 hrs at 150 F.)*, cps | 7 | 9 | 12 | 6 | 8 | 6 |
| Viscosity Increase, cps | none | slight | slight | none | none | none |
| Settling | light | none | light | none | none | none |
| API Filtrate, mL/30 min | 13.4 | 10.1 | 3.8 | 22.4 | 31.8 | 31.3 |
| HPHT Filtrate**, mL/30 min | 34.4 | 28.0 | 26.6 | 90.4 | 58.4 | 68.4 |

*Viscosity tests conducted at 120 F.
**High pressure high temperature fluid loss tests conducted at 300 F.

TABLE 20

Drilling Compositions

| | Composition Number | | | | | | |
|---|---|---|---|---|---|---|---|
| Composition Description | 1 | 2 | 3 | 4 | 5 | 6 | 7 |
| Fresh water, mL | 320 | 320 | 320 | 320 | 320 | 320 | 320 |
| NewGel NT, g | 10.0 | 10.0 | 10.0 | 10.0 | 10.0 | 10.0 | 10.0 |
| NewEdge, g | 5.0 | 5.0 | 5.0 | 5.0 | 5.0 | 5.0 | 5.0 |
| Caustic Soda, g | 2.0 | 2.0 | 2.0 | 2.0 | 2.0 | 2.0 | 2.0 |
| XC polymer, g | 0.50 | 0.50 | 0.50 | 0.50 | 0.50 | 0.50 | 0.50 |
| Barite, g | 81.2 | 81.2 | 81.2 | 81.2 | 81.2 | 81.2 | 81.2 |
| VOH/AMPS Copolymer | — | 1.0 | — | — | 4.0 | — | — |
| VOH/AMPS Copolymer | — | — | 1.0 | — | — | 4.0 | — |
| VOH/AMPS Copolymer | — | — | — | 1 | — | — | 4 |

TABLE 21

| | Rheology | | | | | | | | | | | | | |
|---|---|---|---|---|---|---|---|---|---|---|---|---|---|---|
| | Composition | | | | | | | | | | | | | |
| | 1 | | 2 | | 3 | | 4 | | 5 | | 6 | | 7 | |
| | 80° F. | 120° F. | 80° F. | 120° F. | 80° F. | 120° F. | 80° F. | 120° F. | 80° F. | 120° F. | 80° F. | 120° F. | 80° F. | 120° F. |
| Rheology (Before Hot Rolling) | | | | | | | | | | | | | | |
| 600 rpm | 28 | 19 | 37 | 42 | 39 | 36 | 46 | 42 | 38 | 45 | 46 | 42 | 58 | 48 |
| 300 rpm | 18 | 12 | 25 | 28 | 26 | 24 | 31 | 27 | 25 | 34 | 30 | 27 | 38 | 30 |
| 200 rpm | 14 | 10 | 18 | 20 | 19 | 17 | 24 | 22 | 19 | 30 | 22 | 21 | 28 | 23 |
| 100 rpm | 9 | 6 | 13 | 14 | 13 | 12 | 17 | 15 | 13 | 26 | 14 | 13 | 18 | 15 |
| 6 rpm | 3 | 3 | 5 | 5 | 5 | 4 | 6 | 5 | 4 | 13 | 4 | 4 | 6 | 5 |
| 3 rpm | 2 | 2 | 3 | 3 | 3 | 3 | 5 | 3 | 3 | 12 | 3 | 3 | 4 | 3 |
| Plastic viscosity, cps | 10 | 7 | 12 | 14 | 13 | 12 | 15 | 15 | 13 | 11 | 16 | 15 | 20 | 18 |
| Yield point, lb/100 ft$^2$ | 8 | 5 | 13 | 14 | 13 | 12 | 16 | 12 | 12 | 23 | 14 | 12 | 18 | 12 |
| Initial gel, lb/100 ft$^2$ | 3 | 3 | 5 | 5 | 5 | 4 | 7 | 5 | 3 | 6 | 4 | 4 | 6 | 4 |
| 10 minute gel, lb/100 ft$^2$ | 8 | 7 | 12 | 10 | 12 | 10 | 15 | 12 | 18 | 42 | 19 | 13 | 14 | 12 |
| pH | 11.87 | | 11.78 | | 11.77 | | 11.75 | | 11.7 | | 11.7 | | 11.7 | |
| Rheology (After Hot Rolling) After hot rolling 16 hrs @ 150° F. - | | | | | | | | | | | | | | |
| 600 rpm | 25 | 22 | 33 | 30 | 29 | 26 | 29 | 26 | 36 | 32 | 37 | 31 | 34 | 32 |
| 300 rpm | 18 | 15 | 22 | 19 | 19 | 17 | 19 | 17 | 24 | 21 | 24 | 20 | 22 | 20 |
| 200 rpm | 12 | 11 | 16 | 14 | 15 | 13 | 14 | 13 | 17 | 15 | 17 | 15 | 16 | 14 |
| 100 rpm | 9 | 8 | 11 | 10 | 10 | 9 | 10 | 9 | 11 | 10 | 11 | 10 | 11 | 10 |
| 6 rpm | 3 | 3 | 3 | 3 | 3 | 3 | 3 | 3 | 4 | 3 | 4 | 3 | 3 | 3 |
| 3 rpm | 2 | 2 | 2 | 2 | 2 | 2 | 2 | 2 | 3 | 2 | 3 | 2 | 2 | 2 |
| Plastic viscosity, cps | 7 | 7 | 11 | 11 | 10 | 9 | 10 | 9 | 12 | 11 | 13 | 11 | 12 | 12 |
| Yield point, lb/100 ft$^2$ | 11 | 8 | 11 | 8 | 9 | 8 | 9 | 8 | 12 | 10 | 11 | 9 | 10 | 8 |
| Initial gel, lb/100 ft$^2$ | 3 | 2 | 4 | 3 | 3 | 3 | 3 | 3 | 4 | 3 | 4 | 3 | 3 | 2 |
| 10 minute gel, lb/100 ft$^2$ | 6 | 5 | 11 | 9 | 8 | 9 | 8 | 9 | 9 | 7 | 9 | 6 | 6 | 4 |
| API filtrate, mL/30 min | 13.4 | | 10.6 | | 9.6 | | 10.1 | | 4.2 | | 3.8 | | 3.8 | |
| API filter cake, 1/32nd in | 2 | | 2 | | 2 | | 2 | | 1 | | 1 | | 1 | |
| HTHP filtrate @ 300° F., mL/30 min | 34.4 | | 28.0 | | 27.4 | | 28.0 | | 26.8 | | 26.2 | | 26.6 | |
| HTHP filter cake, 1/32nd in | 5 | | 4 | | 4 | | 4 | | 4 | | 4 | | 4 | |
| pH | 10.98 | | 10.92 | | 10.93 | | 10.95 | | 10.9 | | 10.9 | | 10.9 | |
| Mud alkalinity, ml | 3.2 | | 3.1 | | 3.1 | | 3.2 | | 3.10 | | 3.10 | | 3.20 | |
| Filtrate alkalinities - Pf/Mf, ml | 2.40 | 3.10 | 2.30 | 4.20 | 2.30 | 4.20 | 2.40 | 4.00 | 2.30 | 4.20 | 2.30 | 4.30 | 2.40 | 4.40 |
| Chlorides, mg/L | 600 | | 600 | | 600 | | 600 | | 600 | | 600 | | 600 | |
| Total Hardness, mg/L | 60 | | 60 | | 60 | | 60 | | 80 | | 80 | | 80 | |
| Refractive index, deg Brix Activity | | | | | | | | | | | | | | |
| Settling | Light | | None | | None | | None | | None | | Light | | Light | |

This data shows that the addition of copolymer did not adversely affect the plastic viscosity of the drilling mud either before or after hot rolling. Seeing no viscosity increase or hot rolling in combination with little to no additional settling as compared to the unmodified mud indicates that the additive performs well as a shale stabilizer. Finally, the numbers for API and HTHP filtrate indicate that the copolymer does not adversely affect fluid loss performance and in fact reduces fluid loss.

Hydraulic Cement

The resins of the invention are also particularly effective fluid loss additives for hydraulic cement compositions, for example, for use in petroleum well applications. Petroleum well cementing involves mixing a slurry of cement, water, and other additives and pumping it down through steel casing to critical points in the oil well annulus around the casing or in the open hole below the casing string. The primary functions of the cementing process are to restrict fluid movement between geological formations and to bond and support the casing. In addition, the cement aids in protecting the casing from corrosion, preventing blowouts by quickly sealing formations, protecting the casing from shock loads in drilling deeper wells, and sealing off lost circulation or thief zones. A common problem in petroleum well cementing is the flow of liquid from the cement slurry into porous earth formations in contact with the cement. This fluid loss is undesirable since it can result in dehydration of the cement slurry, and it causes thick filter cakes of cement solids which can plug the well bore. The fluid lost can damage sensitive formations. Cement fluid loss is particularly a problem in the process known as squeeze cementing. There is a requirement, therefore, for materials which, when added to the cement formulation, reduce the loss of fluid from the slurry to porous formations. Polyvinyl alcohol resins are used for this purpose in hydraulic cement compositions. See U.S. Pat. No. 6,180,689 of Moulin; U.S. Pat. No. 5,728,210 entitled "Composition and Method to Control Cement Slurry Loss and Viscosity" of Moran et al. and U.S. Pat. No. 5,850,880 entitled "Composition and Method to Control Cement Slurry Loss and Viscosity" of Moran et al. The polyvinyl alcohol resins of the present invention exhibit surprising effectiveness as a hydraulic cement fluid loss additive, at much lower viscosity than conventional polyvinyl alcohol resins as will be appreciated from the data which follows. In the tables, "By weight of cement" (bwoc) refers to a weight of an additive in dry form as added to the cement composition based on the cement solids only. "API fluid loss" is measured in accordance with American Petroleum Institute Specification 10, July 1990 and is expressed in ml/30 min unless otherwise indicated. "Characteristic viscosity" or viscosity of a resin is measured in 4% w/w aqueous solution at 20° C.

Cement compositions were conventionally prepared and tested for fluid loss. Results appear in FIG. 1 and in Table 22 below. Table 23 provides details on the compositions. DAXAD refers to a dispersant; GCR refers to a commercially available defoamer.

This data shows that the copolymer preferentially affects fluid loss performance, as it does not follow conventional linear behavior versus viscosity. The inventive VOH/AMPS Copolymer shows unexpectedly effective reduction of fluid loss in cement. In the oil field cementing industry, API Fluid Loss performance of less than 100 mL/30 minutes is considered good. API Fluid Loss performance of less than 50 mL/30 min is considered very good. Therefore, Celvol 540S is a standard in the industry. The copolymer demonstrated API Fluid Loss performance near 50 mL/30 min, indicating its potential for use in this application.

TABLE 22

Fluid Loss Comparison

| Fluid Loss Control Additive | Celvol 203S | Celvol 540S*** | PVOH/AMPS Copolymer |
|---|---|---|---|
| Characteristic Viscosity (average), cps | 4 | 50 | 12 |
| Ratio of Dispersant to Fluid Loss Control Additive | 2:1 | 2:1 | 2:1 |
| Test Temperature, deg F.* | 190 | 190 | 180 |
| API Fluid Loss, mL/30 min | 157** | 32 | 52** |

*A 10 deg F. difference in test temperature is negligible
**Calculated API Fluid Loss
***Celvol 540S was used at half the concentration of the others

TABLE 23

Cement Compositions

| Component | Units | Type | Conc. | Specific Gravity | Grams |
|---|---|---|---|---|---|
| Cement | #/sk | Lehigh Class H | 94.00 | 3.140 | 851.80 |
| Poz | | | | | 0.00 |
| | % bwoc | DAXAD 19 | 2.00 | 1.430 | 17.04 |
| | % bwoc | VOH/AMPS Copolymer PVA (R-88) | 1.00 | 0.600 | 8.52 |
| | % bwoc | GCR-4 | 0.20 | 1.510 | 1.70 |
| Water | gal/sk | fresh | 4.00 | 1.000 | 302.21 |
| | % bwow | | | | 0.00 |
| Cement | #/sk | Lehigh Class H | 94.00 | 3.140 | 851.80 |
| Poz | | | | | 0.00 |
| | % bwoc | DAXAD 19 | 2.00 | 1.430 | 17.04 |
| | % bwoc | 203-S PVA (R-65) | 1.00 | 0.600 | 8.52 |
| | % bwoc | GCR-4 | 0.20 | 1.510 | 1.70 |
| Water | gal/sk | fresh | 4.00 | 1.000 | 302.21 |
| | % bwow | | | | 0.00 |
| Cement | #/sk | Lehigh Class H | 94.00 | 3.140 | 851.40 |
| Poz | | | | | 0.00 |
| | % bwoc | DAXAD 19 | 1.00 | 1.430 | 8.51 |
| | % bwoc | celvol 540-s | 0.50 | 0.600 | 4.26 |
| | % bwoc | GCR-4 | 0.20 | 1.510 | 1.70 |
| Water | gal/sk | fresh | 4.18 | 1.000 | 315.40 |
| | % bwow | | | | 0.00 |

The inventive resins are thus useful in a broad range of hydraulic cement compositions to control fluid loss. Included in such compositions may be ground granulated blast-furnace slag, natural cement, portland cement, modified portland cement, masonry cement, hydraulic hydrated lime, and combinations of these and other materials. By portland cement is meant a hydraulic cement produced by pulverizing clinker, comprising hydraulic calcium silicates, calcium aluminates, and calcium aluminoferrites, and usually containing one or more of the forms of calcium sulfate as an interground addition, and includes, of course portland cement, the specification for which is set forth in ASTM specification C 150, and cements that are chemically similar or analogous to portland cement, the specifications for which are set forth in ASTM specifications C 1157, C 595, and C 845. The cement composition described herein may contain other additives or ingredients and should not be limited to the stated formulations. In addition to fluid loss additives, cement additives that can be added include, but are not limited to: set accelerators, set retarders, air-entraining agents, defoamers, corrosion inhibitors, strength enhancing agents, fibers, dampproofing admixtures, expansive agents, permeability reducers, pumping aids, fungicidal admixtures, germicidal admixtures, insecticidal admixtures, shrinkage reducing admixtures, aggregates, pozzolans, viscosifying agents, weighting agents and any other admixture or additive that does not adversely affect the properties of the admixture. Further details may be found in copending U.S. patent application Ser. No. 626,971, Publication No. 20040127606.

The resins of the invention can be used alone as fluid loss additives or combined with conventional polyvinyl alcohol resins as part of a polymeric fluid loss additive package which may further include cellulose derivatives and acrylamide copolymers. Suitable polymers are enumerated in U.S. Pat. Nos. 4,557,763 and 4,626,285. Preferred cellulose derivatives include hydroxyethyl cellulose ("HEC") and carboxymethylhydroxy-ethyl cellulose ("CMHEC"). Another class of polymers useful in connection with the present invention are acrylamide copolymers with, for example, acrylic acid. One suitable class is hydrolyzed copolymers of acrylamide and 2-acrylamido, 2-methyl propane sulfonic acid ("AMPS/AA" copolymer additive). Still another example of a preferred second fluid loss additive is copolymers of N,N-dimethylacrylamide and 2-acrylamido, 2-methyl propane sulfonic acid ("NNDMA/AMPS" copolymer additive). Preferably, the cellulose derivative use is controlled so as not to retard setting more than is desired.

A dispersant if used in the aqueous cement dispersion can be any suitable dispersant such as calcium lignosulfonates, beta naphthalene sulfonates, sulfonated melamine formaldehyde condensates, polyaspartates, or sodium naphthalene sulfate formaldehyde condensate resins, for example, LOMAR® D. (Cognis Inc., Cincinnati, Ohio). Additionally, polycarboxylate dispersants can be used, by which is meant a dispersant having a carbon backbone with pendant side chains, wherein at least a portion of the side chains are attached to the backbone through a carboxyl group or an ether group. The term dispersant is also meant to include those chemicals that also function as a plasticizer, high range water reducer, fluidizer, antiflocculating agent, or superplasticizer for cement compositions. Examples of polycarboxylate dispersants can be found in U.S. Pat. Nos. 6,267,814; 6,290,770; 6,310,143; 6,187,841; 5,158,996; 6,008,275; 6,136,950; 6,284,867; 5,609,681; 5,494,516; 5,674,929; 5,660,626; 5,668,195; 5,661,206; 5,358,566; 5,162,402; 5,798,425; 5,612,396; 6,063,184; 5,912,284; 5,840,114; 5,753,744; 5,728,207; 5,725,657; 5,703,174; 5,665,158; 5,643,978; 5,633,298; 5,583,183; and 5,393,343, which are incorporated herein by reference.

The resins of the invention are used in other mineral containing dispersions such as clay coatings, discussed below.

Mineral Containing Aqueous Dispersions and Color Coat Compositions

The polyvinyl alcohol resins provided with a sulfonic acid functionality in accordance with the invention may be used as a slip additive and co-binder in aqueous pigment coating compositions. The inventive resins are operative to reduce slurry viscosity and have the advantages that they are highly soluble (little if any cooking required) and boost brightener performance. Suitably, a composition includes (parts by wt): 100 parts pigment containing clay and/or calcium carbonate and 0 to 35 parts secondary pigment such as titanium dioxide; 0.01 to 0.5 parts dispersing or stabilizing agent; 1 to 30 parts latex polymer binder emulsion (solids basis); 0.1 to 10 parts, preferably 0.5 to 2 parts, polyvinyl alcohol (sulfonated or mixed with PVOH) co-binder; 0.1 to 20 parts other co-binders; 0 to 0.2 parts defoamer, and sufficient water to provide the desired level of solids, usually about 45 to 70 wt. %, preferably 60 to 70 wt. % or more for high solids paper coating compositions. Suitable optical brighteners optionally included are of the stilbene class such as are disclosed in U.S. Pat. Nos. 6,620,294 and 5,830,241. Commercially available optical brighteners include UVITEX® and TINOPAL® from Ciba Specialty Chemicals, BLANKOPHOR® from Bayer and HOSTALUX®, LEUCOPHOR® from Clariant and PARAWHITE® from Paramount. In some preferred embodiments, the optical brightener active ingredient comprises a stilbene compound and may be a sulfonated stilbene compound, such as a tetrasulfonated stilbene compound or a hexasulfonated stilbene compound. One preferred class is wherein the optical brightener active ingredient comprises a stilbene compound of the formula:

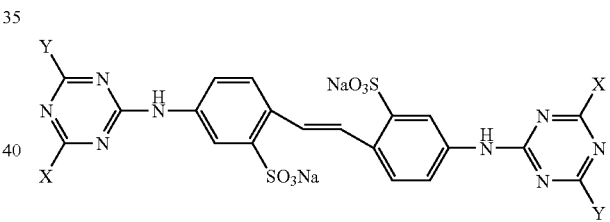

wherein X and Y are independently selected from the moieties indicated below:

| | Disulfo | Tetrasulfo 1 | Tetrasulfo 2 | Hexasulfo |
|---|---|---|---|---|
| X | —N(CH$_2$CH$_2$OH)$_2$ | —N(CH$_2$CH$_2$OH)$_2$ | —N(CH$_2$CHOH-CH$_3$)$_2$ | —N(CH$_2$CH$_2$OH)$_2$ |
| Y | —NH—C$_6$H$_5$ | —NH—C$_6$H$_4$—SO$_3$Na | —NH—C$_6$H$_4$—SO$_3$Na | —NH—C$_6$H$_3$(SO$_3$Na)$_2$ |

Color coat formulations are formulated by conventional techniques and are sometimes expressed in dry parts and wet parts per 100 parts dry pigment. A typical or "standard" coating formulation is as follows:

| | |
|---|---|
| 100 parts dry pigment @ 70% solids = | 142.9 wet parts |
| 14 dry parts latex @ 50% solids = | 28 wet parts |
| 0.34 dry parts @ 17% OB Active Ingredient = | 2 wet parts |
| 1 dry part PVOH @ 25% solids = | 4 wet parts |

The coating compositions produced may be applied to fibrous paper webs using any of the conventional coating devices, including trailing blade coaters, air-knife coaters roll coaters, and the like. Further detail may be found in U.S. Pat. No. 5,057,570 to Air Products and Chemicals, Oct. 15, 1991, which describes a process for producing paper coating compositions using partially hydrolyzed, low molecular weight polyvinyl alcohol. The advantage of using this polymer is that no external heating is required and that it can be added as a dry solid to the aqueous pigment dispersion. This can be accomplished under high shear stirring, typically at speeds of 1500 rpm for 5 minutes at room temperature. See also U.S. Pat. No. 6,620,294.

Figure 2:
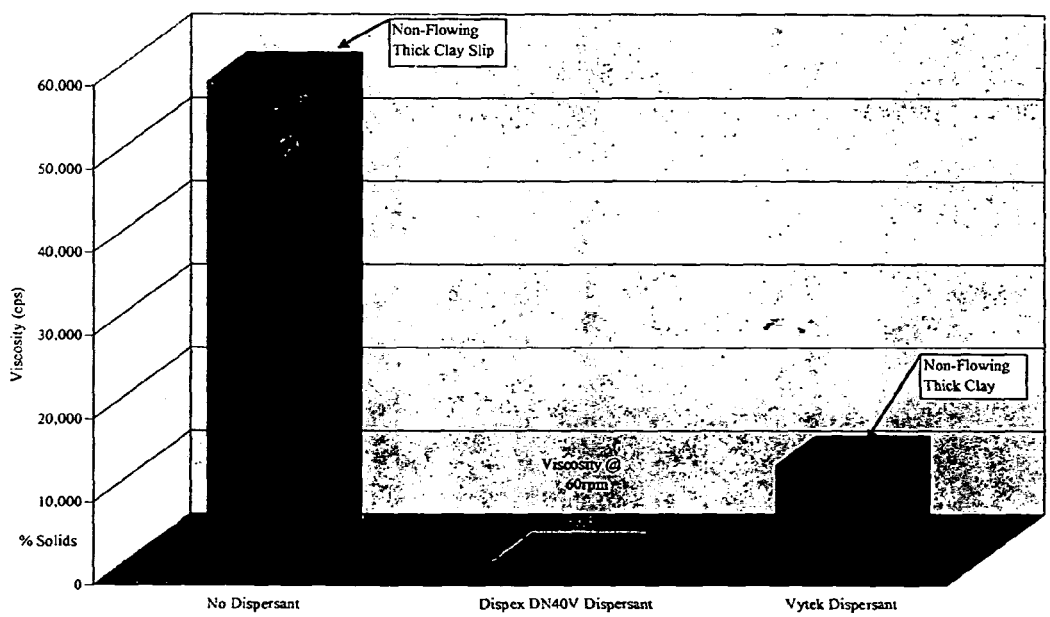
FIG. 2 is a histogram illustrating the usefulness of the VOH/AMPS copolymer of the invention as a slip agent for concentrated clay dispersions.

It is seen in the following that the inventive resins reduce clay slurry viscosity for processability. To this end, a series of 55-60% solids clay slurries were prepared and tested as described in Table 24. Results are presented graphically in FIG. 2.

TABLE 24

Clay Slip Dispersion Study

| Formulation | | |
|---|---|---|
| Dry | | Wet |
| 1) Clay Slip without Dispersant | | |
| 329.7 | RP-2 Clay | 568.4 |
| 2) Clay Slip with Dispex DN40V (dispersant): | | |
| 600 | RP-2 Clay | 1047.1 |
| 3 | DN40V | 7.5 |
| 3) Clay Slip with VOH/AMPS Copolymer | | |
| 600 | RP-2 Clay | 1011.8 |
| 3 | VOH/AMPS Copolymer | 30 |

| Formulation | % Solids | Viscosity (cps) | Comments |
|---|---|---|---|
| Clay slip no Dispersant | 57.5 | 58,000 | Visc. @ 6.0 rpm, RT sp #4, non-flowing thick clay slip. |
| Clay Slip w/DN40V | 56.9 | 138 | Visc. @ 60 rpm sp #2, very fluid clay slip. |
| Clay Slip w/VOH/AMPS Copolymer | 56.2 | 11,957 | Visc. @ 30 rpm, RT sp #4, non-flowing thick clay slip. |

It is seen from the data that the PVOH/AMPS resins of the invention are effective slip agents. Thus, the PVOH/AMPS resins can be used a slip agent and brightener booster, performing both functions and reducing the need for multiple additives.

The resins of the invention can also be added at the wet end of a papermaking machine as noted below.

Aqueous Papermaking Furnishes

Aqueous papermaking furnishes used to make paper generally include cellulosic fiber (chemical or mechanical pulp) dispersed in water at low loading and chemical additives. The furnish is processed into either fine papers or absorbent sheet such as tissue or towel. See U.S. Pat. No. 6,752,907 to Edwards et al. for a summary of some of the various processes. The chemical additives to the furnish frequently alter the physical properties of the paper produced and may be included as processing aids. Such chemistries are well understood by the skilled artisan and may include surface modifiers, softeners, debonders, strength aids, latexes, opacifiers, optical brighteners, dyes, pigments, sizing agents, barrier chemicals, retention aids, insolubilizers, organic or inorganic crosslinkers, or combinations thereof, optionally comprising polyols, starches, PPG esters, PEG esters, phospholipids, surfactants, polyamines, HMCP or the like.

The pulp can be mixed with strength adjusting agents such as wet strength agents, dry strength agents and debonders/softeners and so forth. A comprehensive but non-exhaustive list of useful strength aids include urea-formaldehyde resins, melamine formaldehyde resins, glyoxylated polyacrylamide resins, polyamide-epichlorohydrin resins and the like. Thermosetting polyacrylamides are produced by reacting acrylamide with diallyl dimethyl ammonium chloride (DADMAC) to produce a cationic polyacrylamide copolymer which is ultimately reacted with glyoxal to produce a cationic cross-linking wet strength resin, glyoxylated polyacrylamide. These materials are generally described in U.S. Pat. Nos. 3,556,932 to Coscia et al. and 3,556,933 to Williams et al., both of which are incorporated herein by reference in their entirety. Resins of this type are commercially available under the trade name of PAREZ 631NC by Bayer Corporation. Different mole ratios of acrylamide/-DADMAC/glyoxal can be used to produce cross-linking resins, which are useful as wet strength agents. Furthermore, other dialdehydes can be substituted for glyoxal to produce thermosetting wet strength characteristics. Of particular utility are the polyamide-epichlorohydrin wet strength resins, an example of which is sold under the trade names Kymene 557LX and Kymene 557H by Hercules Incorporated of Wilmington, Del. and Amres® from Georgia-Pacific Resins, Inc. These resins and the process for making the resins are described in U.S. Pat. Nos. 3,700,623 and 3,772,076 each of which is incorporated herein by reference in its entirety. An extensive description of polymeric-epihalohydrin resins is given in Chapter 2: *Alkaline-Curing Polymeric Amine-Epichlorohydrin* by Espy in *Wet Strength Resins and Their Application* (L. Chan, Editor, 1994), herein incorporated by reference in its entirety. A reasonably comprehensive list of wet strength resins is described by Westfelt in *Cellulose Chemistry and Technology* Volume 13, p. 813, 1979, which is incorporated herein by reference.

Suitable temporary wet strength agents may likewise be included. A comprehensive but non-exhaustive list of useful temporary wet strength agents includes aliphatic and aromatic aldehydes including glyoxal, malonic dialdehyde, succinic dialdehyde, glutaraldehyde and dialdehyde starches, as well as substituted or reacted starches, disaccharides, polysaccharides, chitosan, or other reacted polymeric reaction products of monomers or polymers having aldehyde groups, and optionally, nitrogen groups. Representative nitrogen containing polymers, which can suitably be reacted with the aldehyde containing monomers or polymers, includes vinyl-amides, acrylamides and related nitrogen containing polymers. These polymers impart a positive charge to the aldehyde containing reaction product. In addition, other commercially available temporary wet strength agents, such as, PAREZ 745, manufactured by Cytec can be used, along with those disclosed, for example in U.S. Pat. No. 4,605,702.

The temporary wet strength resin may be any one of a variety of water-soluble organic polymers comprising aldehydic units and cationic units used to increase dry and wet tensile strength of a paper product. Such resins are described in U.S. Pat. Nos. 4,675,394; 5,240,562; 5,138,002; 5,085,736; 4,981,557; 5,008,344; 4,603,176; 4,983,748; 4,866,151; 4,804,769 and 5,217,576. Modified starches sold under the trademarks CO-BOND® 1000 and CO-BOND® 1000 Plus, by National Starch and Chemical Company of Bridgewater, N.J. may be used. Prior to use, the cationic aldehydic water soluble polymer can be prepared by preheating an aqueous slurry of approximately 5% solids maintained at a temperature of approximately 240 degrees Fahrenheit and a pH of about 2.7 for approximately 3.5 minutes. Finally, the slurry can be quenched and diluted by adding water to produce a mixture of approximately 1.0% solids at less than about 130 degrees Fahrenheit.

Other temporary wet strength agents, also available from National Starch and Chemical Company are sold under the trademarks CO-BOND® 1600 and CO-BOND® 2300. These starches are supplied as aqueous colloidal dispersions and do not require preheating prior to use.

Suitable dry strength agents include starch, guar gum, polyacrylamides, carboxymethyl cellulose and the like. Of particular utility is carboxymethyl cellulose, an example of which is sold under the trade name Hercules CMC, by Hercules Incorporated of Wilmington, Del. According to one embodiment, the pulp may contain from about 0 to about 15 lb/ton of dry strength agent. According to another embodiment, the pulp may contain from about 1 to about 5 lbs/ton of dry strength agent.

Debonders or softeners may also be incorporated into the pulp or sprayed upon the web after its formation. Such materials are disclosed in U.S. Pat. No. 4,720,383. Evans, *Chemistry and Industry*, 5 Jul. 1969, pp. 893-903; Egan, *J. Am. Oil Chemist's Soc.*, Vol. 55 (1978), pp. 118-121; and Trivedi et al., *J. Am. Oil Chemist's Soc.*, June 1981, pp. 754-756, incorporated by reference in their entirety, indicate that softeners are often available commercially only as complex mixtures rather than as single compounds. Biodegradable softeners can be utilized. Representative biodegradable cationic softeners/debonders are disclosed in U.S. Pat. Nos. 5,312,522; 5,415, 737; 5,262,007; 5,264,082; and 5,223,096, all of which are incorporated herein by reference in their entirety. The compounds are biodegradable diesters of quaternary ammonia compounds, quaternized amine-esters, and biodegradable vegetable oil based esters functional with quaternary ammonium chloride and diester dierucyldimethyl ammonium chloride and are representative biodegradable softeners.

The polyvinyl alcohol resins of the present invention an be added to papermaking furnish at the wet end of a papermachine as a strength agent, dispersant, other processing aid and so forth, either alone or in combination with any of the agents noted above and has the advantage of being repulpable; a highly desirable feature for recycling.

Melt Extrusion

The copolymers of PVOH and a sulfonic acid containing comonomer of this invention (sometimes referred to herein as co-AMPS) are particularly suitable for the melt extrusion of water-soluble or water-swellable films. However, to aid in the melt extrusion of these films, it is sometimes advantageous to add a plasticizer to the melt prior to extrusion. Such plasticizers may be, for example, ethylene glycol (PEG), trimethylene glycol, propylene glycol, 2,2,4-trimethyl-1,3-pentanediol, glycerol, mannitol or pentaerythritol or glycerine.

Another expedient for the smooth melt extrusion of the copolymer is a water-aided extrusion which lowers the melting point somewhat and enables the extrusion of a more uniform melt at a relatively low temperature. This technique involves the formation of a high solids solution of the copolymer which is then extruded into a film from which the moisture is removed through evaporation to form a solid water-free sheet.

To vary the properties of the extruded film, a small amount of one or more additional comonomers, e.g., methyl methacrylate or an olefin such as ethylene or propylene, may be copolymerized with the vinyl acetate and sulfonic acid containing monomer. Such amount may be, for example, about 1 to 10 mole % based on the moles of total comonomers.

In addition to plasticizer, other materials such as a dispersing agent or an acid such as phosphoric acid which neutralizes any sodium acetate forming from the hydrolysis of the acetate in the polymerized vinyl acetate units to form the polymerized vinyl alcohol units in the desired copolymer, may be added to the copolymer melt prior to extrusion.

The extruder used in the melt compounding of the copolymer must be sufficient to provide a melt of desirable properties but not much beyond that necessary to obtain such a melt. Thus, any excess energy provided by the extruder is "waste" energy which must be removed by the extruder to avoid degeneration of the melt. Various extruders are commercially available for this purpose such as Buss Condux kneaders and the Werner and Pfleiderer twin screw extruder.

The water soluble films produced by melt extruding the copolymers of the copolymers of this are useful for any purpose wherein water-solubility is an advantage. The films are particularly suitable for unit-dose packaging of agricultural chemicals, microbiocides and the like, under airtight packaging conditions, where the chemicals in packaged form are thrown into water so that the contents are dissolved or dispersed in the water. This is accomplished with the necessity of the user directly touching harmful chemicals, with the measurement of the chemicals for use being unnecessary since the unit dose is already packaged. Suitable extrusion techniques are further enumerated in U.S. Pat. Nos. 5,137,969 and 5,051, 222, both to Marten et al.

In order to demonstrate a melt extrudability, a series of formulations were prepared utilizing polyethylene glycol as a plasticizer. Particular formulations were melt blended and tested for melt viscosity as a function of shear rate in a capillary viscometer.

Figure 3:
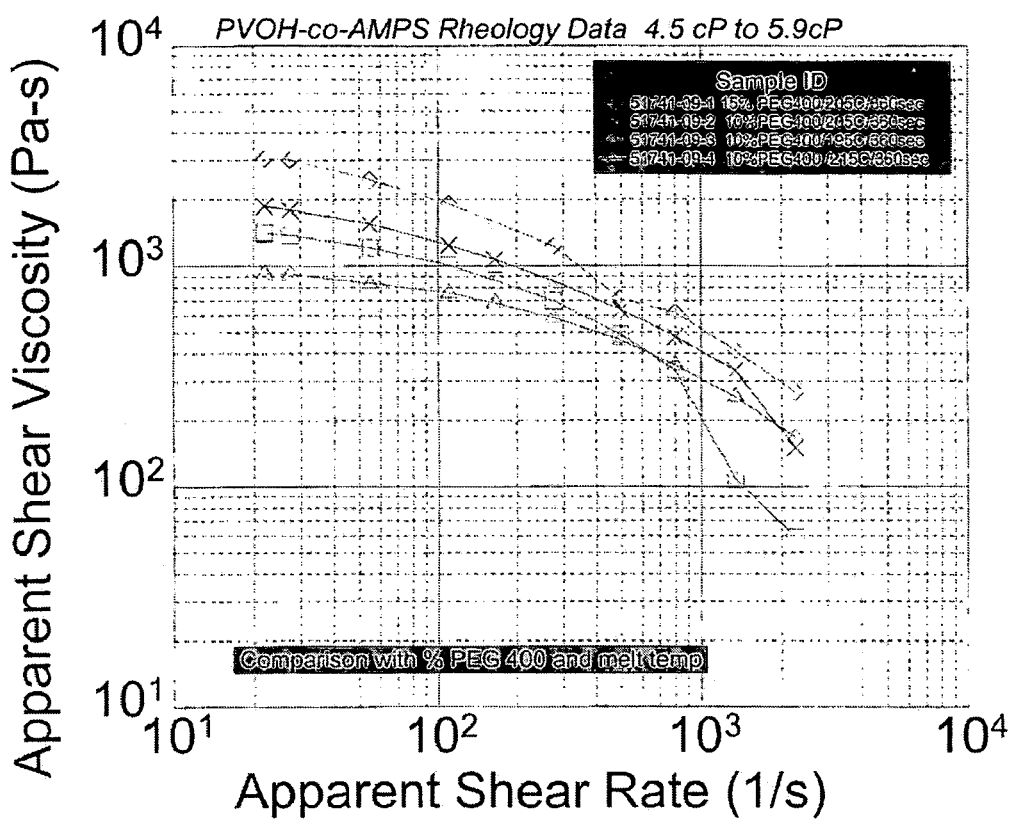
FIGS. 3-5 are plots of Melt Viscosity vs. Shear for various compositions of the invention including VOH/AMPS copolymer and a polyethylene glygol (PEG) plasticizer.
Figure 4:
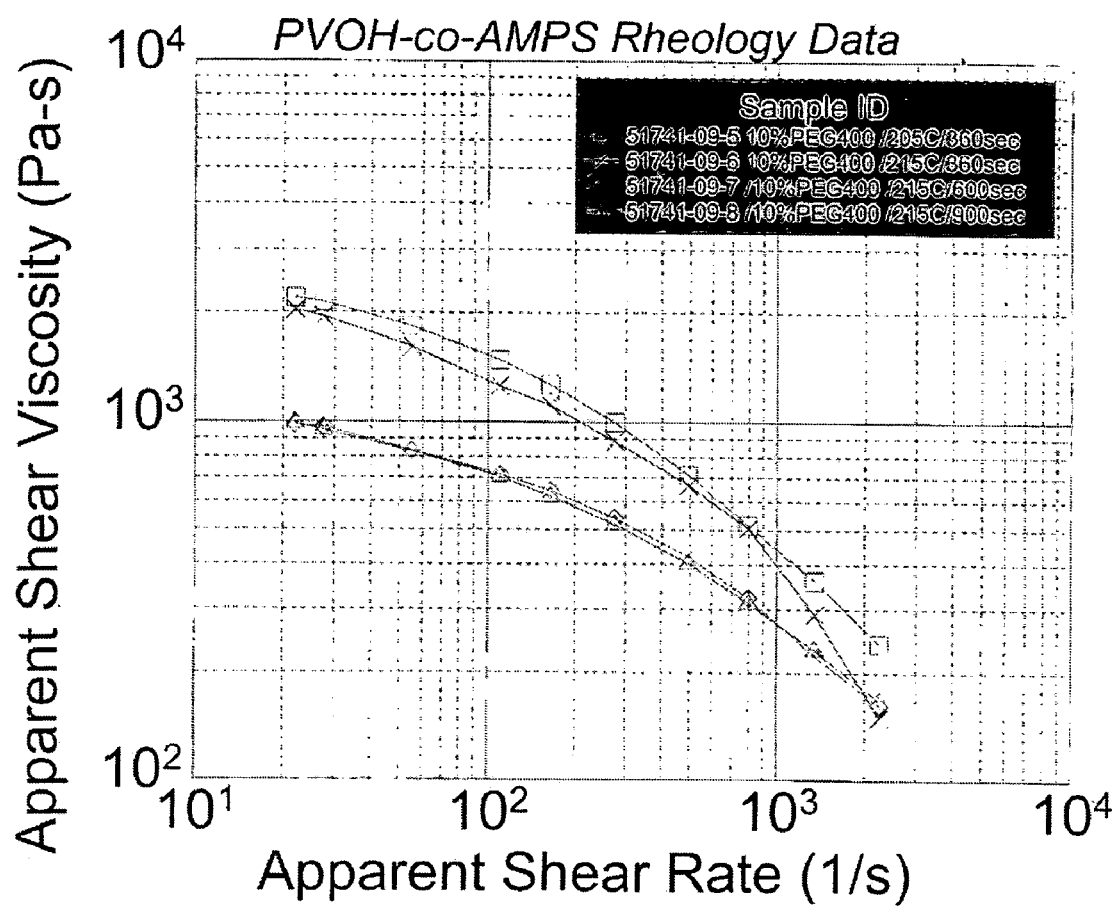
Figure 5:
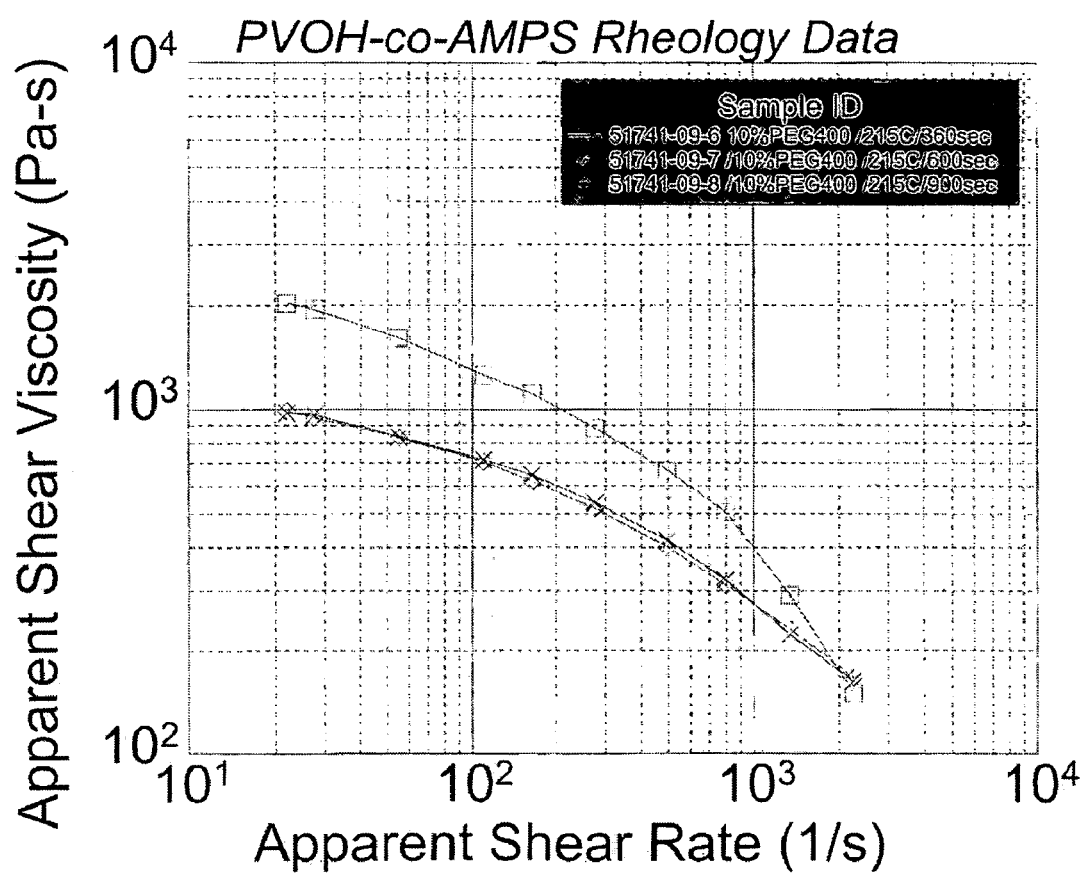

Results appear in FIGS. 3-5.

FIG. 3 shows viscosity profiles of PVOH/AMPS containing 10% PEG-400 with a melt time of 360 seconds at 195° C., 205° C. and 215° C. and compares it with a like sample containing 15% PEG-400 with a melt time of 360 sec at 205° C. This data shows that the melt viscosity of the polymer decreases with increasing temperatures but the smooth curve illustrates conventional viscosity to shear rate behavior.

FIG. 4 shows the viscosity profile of PVOH/AMPS containing 10% PEG-400 tested at 215° C. with increasing melt time. The data shows that increasing the melt time from 360 sec to 600 sec results in a measurable difference in shear viscosity but a further increase to 900 seconds shows no further decrease in shear viscosity. Additionally a curve testing the same material at 205° C. is included for comparison shows essentially no difference between the shear viscosity at 205° C. and 215° C. indicating a resistance to increased melt temperature. The lack of difference in shear viscosity between 600 and 900 seconds may be due to some small MW components such as water is being eliminated due to the added heating duration.

FIG. 5 is similar to FIG. 4 except without the data point at 205° C.

It is appreciated from FIGS. 3-5 that the polymer of the invention is readily extruded at temperatures ranging from about 190° C.-220° C.

While the invention has been described in connection with several examples, modifications to those examples within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary.

What is claimed is:

1. In a method of preparing an aqueous dispersion selected from drilling fluids, hydraulic cement compositions, mineral pigment containing coatings, and papermaking furnishes, the improvement comprising: a) producing a saponified copolymer of vinyl alcohol (VOH) and 2-acrylamido-2-methyl propane sulfonic acid or a salt of such acid (AMPS) by steps including continuously feeding with agitation, vinyl acetate monomer (VAM) and AMPS as comonomers, a free radical yielding polymerization initiator, and a solvent for said comonomers, initiator, and copolymer resulting from the copolymerization of said comonomers into a first reaction zone, maintaining the resulting reaction mass in said first reaction zone under polymerization conditions for a residence time sufficient for a major proportion of AMPS fed to said first reaction zone to polymerize, continuously feeding reaction mass from said first reaction zone with an additional supply of AMPS to a second reaction zone, maintaining the reaction mass in the second reaction zone for a residence time sufficient to polymerize a major proportion of the AMPS added to the second reaction zone, continuously withdrawing reaction mass from the second reaction zone, separating copolymer of VAM and AMPS from the latter reaction mass, and saponifying by hydrolysis and/or alcoholysis a major proportion of the acetate groups in said copolymer to form a saponified copolymer of VOH and AMPS; and b) incorporating the saponified copolymer into the aqueous dispersion, wherein the AMPS is fed continuously to the second reaction zone such that the compositional drift of AMPS in the resulting copolymer results in the saponified copolymer having low compositional drift with regard to variations in the content of AMPS in the saponified copolymer as determined by $C^{13}$ NMR, as compared to the compositional drift with regard to variations in the content of AMPS in a comparative saponified copolymer of VOH and AMPS produced via a batch process.

2. The process of claim 1, wherein the total amount of AMPS fed to both reaction zones is about 1 to about 20 wt. % based on the total of VAM and AMPS being fed.

3. The process of claim 1, wherein the effluent from said second reaction zone has an actual polymer solids content of about 40 to about 85% and the percent conversion calculated from said actual polymer solids content and the theoretical polymer solids content equal to the amount of monomers added to the system is about 70 to about 99%.

4. The process of claim 1, wherein the relative molecular weight of the VAM/AMPS copolymer obtained from the second reaction zone is indicated by a viscosity of a 15 wt. % solution of the copolymer in methanol of about 4 to about 30 cps.

5. The process of claim 1, wherein the saponified copolymer of VOH and AMPS contains about 1 to about 8 mol % of polymerized AMPS (poly AMPS), about 1 to about 20 mol % of polymerized VAM (PVAc) and about 75 to about 98 mol % of polymerized VOH (PVOH), a degree of hydrolysis of about 70 to at least 99% indicated by $C^{13}$NMR and a relative molecular weight indicated by a viscosity of a 4% aqueous solution of the VOH copolymer of about 3 to about 30 cps.

6. In a method of preparing a drilling fluid aqueous dispersion, the improvement comprising: a) producing a saponified copolymer of vinyl alcohol (VOH) and 2-acrylamido-2-methyl propane sulfonic acid or a salt of such acid (AMPS) by steps including continuously feeding with agitation, vinyl acetate monomer (VAM) and AMPS as comonomers, a free radical yielding polymerization initiator, and a solvent for said comonomers, initiator, and copolymer resulting from the copolymerization of said comonomers into a first reaction zone, maintaining the resulting reaction mass in said first reaction zone under polymerization conditions for a residence time sufficient for a major proportion of AMPS fed to said first reaction zone to polymerize, continuously feeding reaction mass from said first reaction zone with an additional supply of AMPS to a second reaction zone, maintaining the reaction mass in the second reaction zone for a residence time sufficient to polymerize a major proportion of the AMPS added to the second reaction zone, continuously withdrawing reaction mass from the second reaction zone, separating copolymer of VAM and AMPS from the latter reaction mass, and saponifying by hydrolysis and/or alcoholysis a major proportion of the acetate groups in said copolymer to form a saponified copolymer of VOH and AMPS; and b) incorporating the saponified copolymer into the aqueous dispersion, wherein the AMPS is fed continuously to the second reaction zone such that the compositional drift of AMPS in the resulting copolymer results in the saponified copolymer having low compositional drift with regard to variations in the content of AMPS in the saponified copolymer as determined by $C^{13}$ NMR, as compared to the compositional drift with regard to variations in the content of AMPS in a comparative saponified copolymer of VOH and AMPS produced via a batch process.

7. In a method of preparing an aqueous dispersion selected from drilling fluids, hydraulic cement compositions, and pigment coatings including a clay, the improvement comprising: a) preparing a saponified vinyl alcohol resin provided with sulfonic acid functionality by polymerizing vinyl acetate monomer (VAM) and an unsaturated sulfonic acid containing comonomer to produce a copolymer, followed by saponifying by hydrolysis and/or alcoholysis a major proportion of the acetate groups in said copolymer to form a saponified polyvinyl alcohol resin of vinyl alcohol VOH and the sulfonic acid containing comonomer, wherein the saponified polyvinyl alcohol resin consists essentially of recurring units I, II and III,

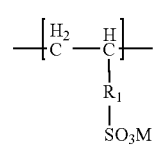

I

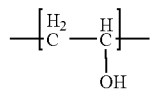

II

35

-continued

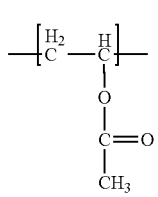

III $R_1$ is present or absent and if present is $C_1$-$C_{20}$ alkylene, $C_4$-$C_8$ cycloalkylene, $C_4$-$C_8$ heterocycloalkylene, arylene, heteroarylene, or —C(=O)—NH—$R_2$ is; $R_2$ is $C_1$-$C_{10}$ alkylene, $C_4$-$C_8$ cycloalkylene, $C_4$-$C_8$ heterocycloalkylene, arylene, alkylarylene, heteroarylene, alkylheteroarylene; M is a cationic counterion or hydrogen; and wherein recurring unit I is present in the saponified resin in an amount of from about 0.5 to about 10 mole percent; recurring unit II is present in the resin in an amount of from about 75 to about 98 mole percent and recurring unit III is present in an amount of from about 1 to about 20 mole percent, and wherein the saponified polyvinyl alcohol resin is prepared by steps including continuously feeding with agitation, VAM, the unsaturated sulfonic acid containing comonomer, a free radical yielding polymerization initiator, and a solvent for said comonomers, initiator, and copolymer resulting from the copolymerization of said comonomers into a first reaction zone, maintaining the resulting reaction mass in the first reaction zone under polymerization conditions for a residence time sufficient for a major proportion of the unsaturated sulfonic acid containing comonomer fed to said first reaction zone to polymerize, continuously feeding reaction mass from said first reaction zone with an additional supply of the unsaturated sulfonic acid containing comonomer to a second reaction zone, maintaining the reaction mass in the second reaction zone for a residence time sufficient to polymerize a major proportion of the unsaturated sulfonic acid containing comonomer added to the second reaction zone, continuously withdrawing reaction mass from the second reaction zone, separating copolymer of VAM and the unsaturated sulfonic acid containing comonomer from the latter reaction mass, and saponifying by hydrolysis and/or alcoholysis a major proportion of the acetate groups in said copolymer to form the saponified polyvinyl alcohol resin; and b) incorporating the saponified polyvinyl alcohol resin into the aqueous dispersion, wherein the unsaturated sulfonic acid containing comonomer is fed continuously to the second reaction zone such that tho compositional drift of the unsaturated sulfonic acid containing comonomer in the resulting copolymer results in the saponified copolymer having low compositional drift

36 with regard to variations in the content of the unsaturated sulfonic acid containing comonomer in the saponified polyvinyl alcohol resin as determined by $C^{13}$ NMR, as compared to the compositional drift with regard to variations in the content of the unsaturated sulfonic acid containing comonomer in a comparative saponified polyvinyl alcohol resin produced via a batch process.

8. The improvement according to claim 7, wherein the saponified polyvinyl alcohol resin consists essentially of the following recurring units:

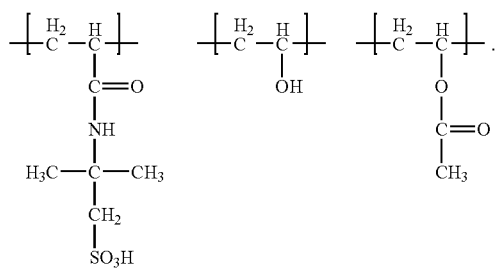

9. The improvement according to claim 7, wherein the saponified polyvinyl alcohol resin consists essentially of the following recurring units:

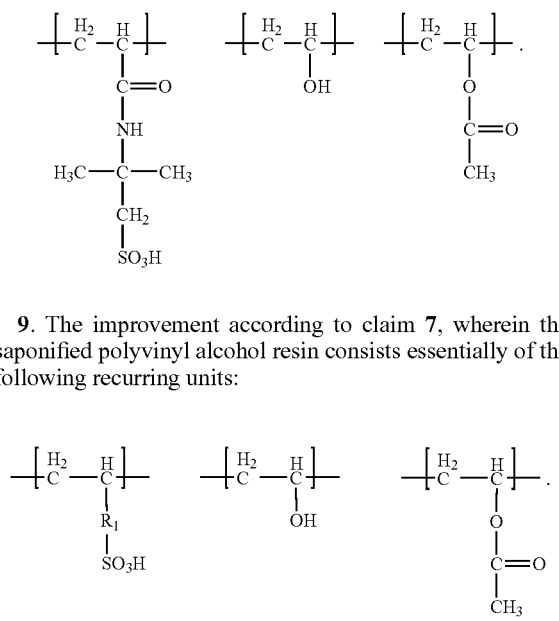

10. The improvement according to claim 7, wherein the saponified polyvinyl alcohol resin consists essentially of the following recurring units:

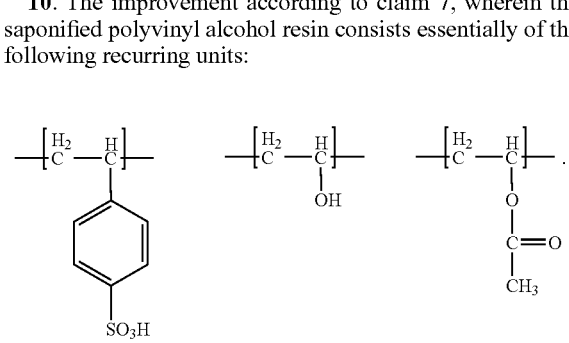

11. The improvement according to claim 7, wherein the aqueous dispersion is a drilling fluid.

* * * * *